(12) United States Patent
Ariyama et al.

(10) Patent No.: US 11,890,546 B2
(45) Date of Patent: Feb. 6, 2024

(54) INFORMATION PROCESSING SYSTEM, COMPUTER-READABLE NON-TRANSITORY STORAGE MEDIUM STORING THEREIN INFORMATION PROCESSING PROGRAM, INFORMATION PROCESSING APPARATUS, AND INFORMATION PROCESSING METHOD

(71) Applicant: Nintendo Co., Ltd., Kyoto (JP)

(72) Inventors: Yuhei Ariyama, Kyoto (JP); Fumiya Nakano, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/214,933

(22) Filed: Mar. 29, 2021

(65) Prior Publication Data
US 2021/0308585 A1 Oct. 7, 2021

(30) Foreign Application Priority Data
Apr. 3, 2020 (JP) ................................ 2020-067262

(51) Int. Cl.
*A63F 13/75* (2014.01)
*A63F 13/63* (2014.01)
(Continued)

(52) U.S. Cl.
CPC .............. *A63F 13/75* (2014.09); *A63F 13/35* (2014.09); *A63F 13/63* (2014.09);
(Continued)

(58) Field of Classification Search
CPC .......... A63F 13/75; A63F 13/35; A63F 13/63; A63F 13/2145; A63F 13/24;
(Continued)

(56) References Cited

U.S. PATENT DOCUMENTS

| 7,775,885 B2 * | 8/2010 | Van Luchene ........ A63F 13/822 463/42 |
| 7,792,801 B2 * | 9/2010 | Hamilton, II ...... G06Q 30/0627 715/757 |

(Continued)

FOREIGN PATENT DOCUMENTS

| JP | 2002-366477 A | 12/2002 |
| JP | 2004-329697 | 11/2004 |

(Continued)

OTHER PUBLICATIONS

JayDeeMC, "Single Player vs Multiplayer Minecraft / Which is better?", https://www.youtube.com/watch?v=8MoD4wyoosl, Oct. 20, 2019. (Year: 2019).*

(Continued)

*Primary Examiner* — Michael A Cuff
(74) *Attorney, Agent, or Firm* — Nixon & Vanderhye, PC

(57) ABSTRACT

An exemplary information processing system is configured to create a route formed by arranging, in a virtual space, a plurality of route parts each associated with a design; determine whether the route created by the user contains a forbidden symbol or a forbidden word. When the route created by the user contains a forbidden symbol or a forbidden word, uploading of the route created by the user to the server is prohibited.

23 Claims, 18 Drawing Sheets

(51) Int. Cl.
*A63F 13/35* (2014.01)
*A63F 13/24* (2014.01)
*A63F 13/2145* (2014.01)

(52) U.S. Cl.
CPC ............ *A63F 13/2145* (2014.09); *A63F 13/24* (2014.09); *A63F 2300/1043* (2013.01); *A63F 2300/1075* (2013.01); *A63F 2300/51* (2013.01); *A63F 2300/5586* (2013.01); *A63F 2300/6009* (2013.01)

(58) Field of Classification Search
CPC ...... A63F 2300/1043; A63F 2300/1075; A63F 2300/51; A63F 2300/5586; A63F 2300/6009
USPC .......................................................... 463/29
See application file for complete search history.

(56) References Cited

U.S. PATENT DOCUMENTS

| | | | |
|---|---|---|---|
| 9,373,213 B1 * | 6/2016 | Archer | A63F 13/42 |
| 10,460,500 B1 * | 10/2019 | Hunt | G06T 15/005 |
| 2004/0224759 A1 | 11/2004 | Nishimura | |
| 2012/0137232 A1 * | 5/2012 | Chopra | G06Q 30/0643 |
| | | | 715/757 |
| 2015/0217189 A1 | 8/2015 | Ninjouji et al. | |
| 2019/0155870 A1 * | 5/2019 | Prakash | G06F 40/143 |
| 2020/0092232 A1 * | 3/2020 | Tojima | H04L 51/02 |
| 2020/0348808 A1 * | 11/2020 | Chiong | G06F 3/04883 |
| 2020/0357503 A1 * | 11/2020 | Sugaya | A61B 5/1128 |
| 2021/0073014 A1 * | 3/2021 | Sofue | G06Q 30/06 |
| 2021/0182781 A1 * | 6/2021 | Takeda | G06Q 10/0833 |
| 2021/0313053 A1 * | 10/2021 | Hirai | G16H 10/20 |
| 2022/0013147 A1 * | 1/2022 | Kawamura | H04N 5/91 |

FOREIGN PATENT DOCUMENTS

| | | |
|---|---|---|
| JP | 2015-144724 | 8/2015 |
| JP | 2016-010452 | 1/2016 |

OTHER PUBLICATIONS

GeminiTay, "World edit tutorial—Copy, Paste, Flip, Potate!", https://www.youtube.com/watch?v=2C-EZIBQ7iM, May 15, 2016 (Year: 2016).*

IGameplay1337, "Flow Free—Free Game Review Gameplay Trailer for iPhone iPad iPod", https://www.youtube.com/watch?v=TCnQPsExQuY, May 2, 2013 (Year: 2013).*

SnT Apps, "iPhone Pipe Game—Pipeland Trailer", https://www.youtube.com/watch?v=pLalbBVFR1k, Feb. 20, 2012 (Year: 2012).*

* cited by examiner

FIG. 5

| NAME | TYPES OF ROUTE PART | | CONNECTION COUNT | ARRANGEMENT DIRECTION (ROTATION ANGLE) |
|---|---|---|---|---|
| | MAIN ROUTE PART | SUB ROUTE PART | | |
| NON-DIRECTIONAL PART | | | 0 | — |
| 1-DIRECTIONAL PART | BACKGROUND IMAGE | BACKGROUND IMAGE | 1 | 0 90 180 270 |
| 2-DIRECTIONAL I-SHAPED PART | ROUTE IMAGE (SOLID LINE) | ROUTE IMAGE (DOTTED LINE) | 2 | 0 90 180 270 |
| 2-DIRECTIONAL L-SHAPED PART | | | 2 | 0 90 180 270 |
| 3-DIRECTIONAL PART | | | 3 | 0 90 180 270 |
| CURVED PART | | | 2 | 0 90 180 270 |

FIG. 7
| BASIC PART | PARTS CONSIDERED TO BE IDENTICAL | | |
|---|---|---|---|
| (A) 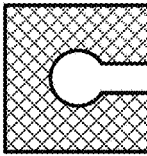 | (a-1) 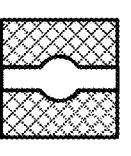 | (a-2) 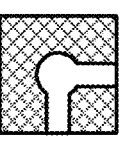 | (a-3) 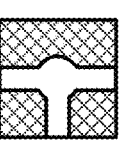 |
| (B) 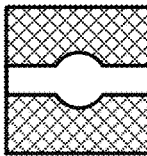 | (b-1) 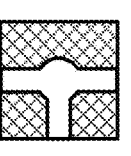 | (b-2) 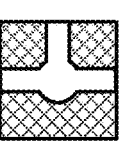 | |
| (C) 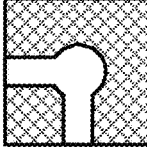 | (c-1) 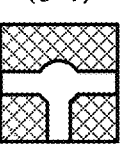 | (c-2) 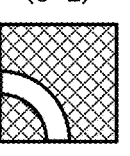 | |
| (D) 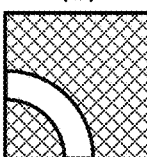 | (d-1) 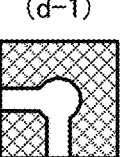 | | |

FIG. 15
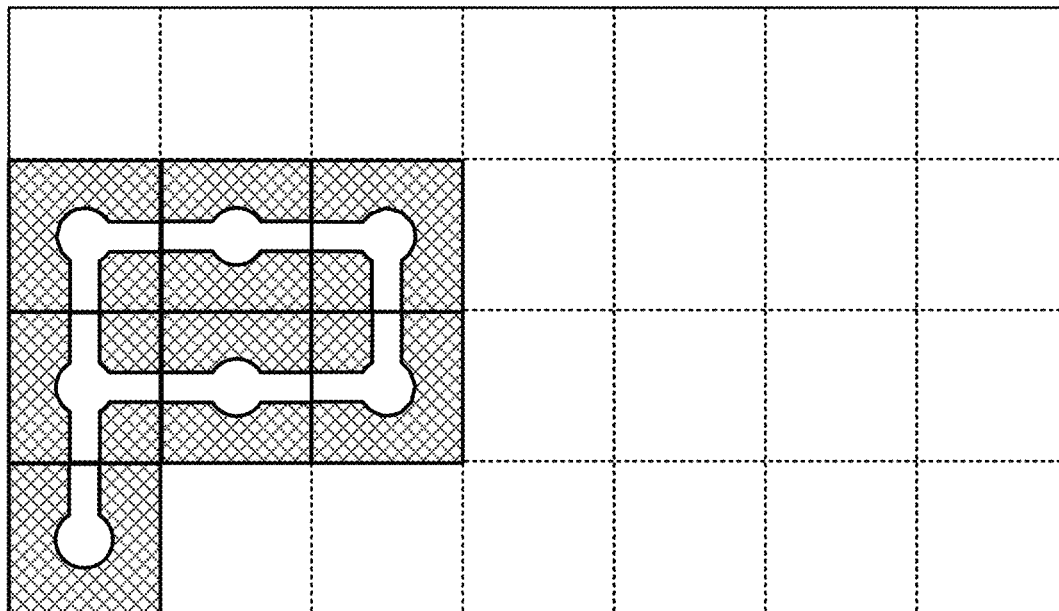
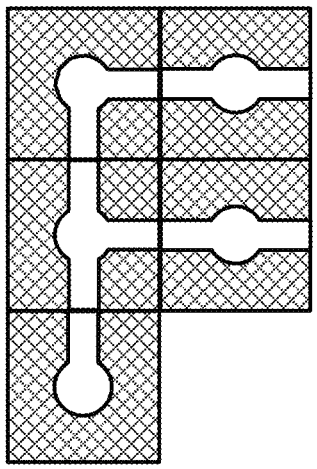
CHARACTER ARRANGEMENT PATTERN CORRESPONDING TO "F"
RECOGNIZED AS "P"
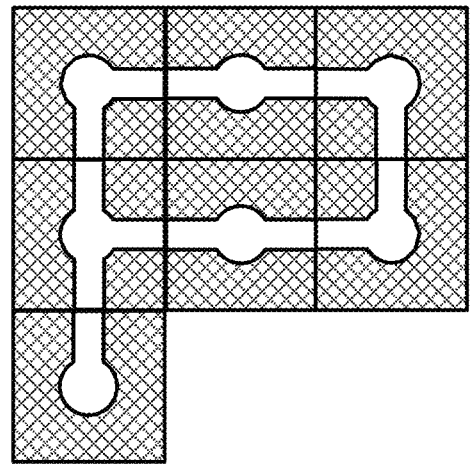
CHARACTER ARRANGEMENT PATTERN CORRESPONDING TO "P"

FIG. 16

| GAME PROGRAM |
| --- |
| ROUTE PART DATA |
| USER ARRANGEMENT PATTERN DATA |
| CHARACTER ARRANGEMENT PATTERN DATA |
| FORBIDDEN SYMBOL PATTERN DATA |
| FORBIDDEN WORD DATA |

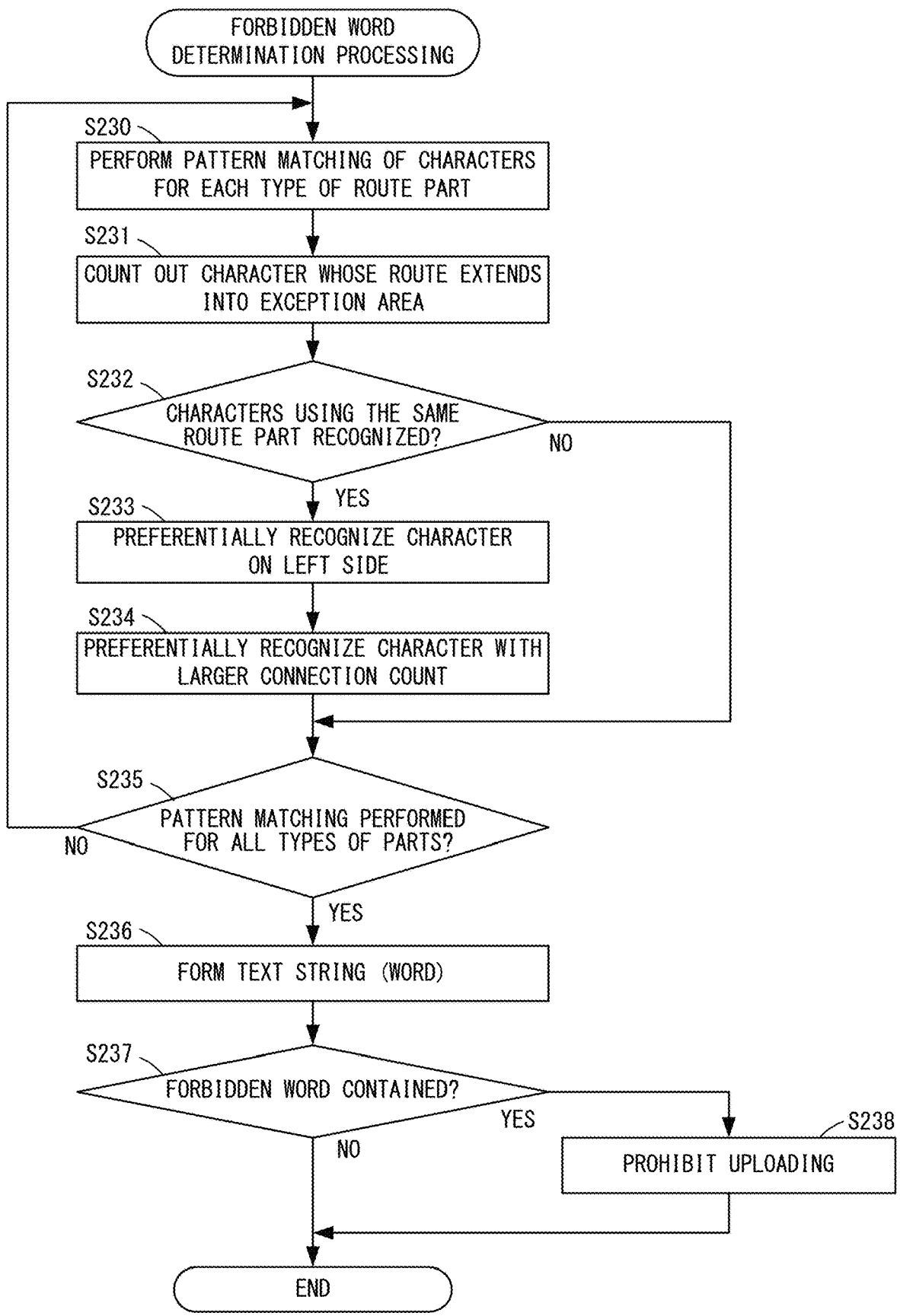

INFORMATION PROCESSING SYSTEM, COMPUTER-READABLE NON-TRANSITORY STORAGE MEDIUM STORING THEREIN INFORMATION PROCESSING PROGRAM, INFORMATION PROCESSING APPARATUS, AND INFORMATION PROCESSING METHOD

CROSS-REFERENCE TO RELATED APPLICATION

This application claims priority to Japanese Patent Application No. 2020-067262 filed on Apr. 3, 2020, the entire contents of which are incorporated herein by reference.

FIELD

This exemplary embodiment relates to an information processing system, an information processing apparatus, an information processing program, and an information processing method, each of which allows an object to be arranged in a virtual space.

BACKGROUND AND SUMMARY

As an existing technology, there has been a system capable of determining if a collection of characters formed by characters arranged in a message includes a forbidden word.

The above existing technology, however, performs the above determination based on the positions of characters arranged, and is not capable of performing such determination in consideration of a design of arranged subjects.

Therefore, an object of this exemplary embodiment is to provide an information processing system, an information processing apparatus, an information processing program, and an information processing method, each of which is capable of taking into consideration a design of an arranged subject.

To achieve the above-described object, this exemplary embodiment adopts a configuration as described below.

Namely, an information processing system of this exemplary embodiment includes at least one processor and at least one memory coupled thereto, the at least one processor being configured to: arrange, in a virtual space, parts respectively associated with designs to be displayed on a display device, according to an arrangement operation by a user; determine whether a user arrangement pattern is a specific pattern, the user arrangement pattern containing, an arrangement position and a design of each of a plurality of the parts arranged in the virtual space according to the arrangement operation by the user, the specific pattern containing a specific design in its collective design formed by the designs of the plurality of the parts; and allow access by another user to arrangement information representing the user arrangement pattern when the user arrangement pattern is not determined as to be the specific pattern, while restricting access by said another user to the arrangement information when the user arrangement pattern is determined as to be the specific pattern.

According to the above, the collective design can be formed in the virtual space by arranging the parts each associated with a design, in the virtual space according to the arrangement operation by the user. When the collective design created by the user contains the specific design, access by another user to the collective design created by the user can be restricted.

Further, the processor may be further configured to rotate an arrangement direction of each of the parts in the virtual space. The processor may determine whether the user arrangement pattern is the specific pattern, the user arrangement pattern containing, the arrangement position, the design, and the arrangement direction of each of the plurality of the parts.

According to the above, the user can change the arrangement direction of each of the parts while arranging the parts in the virtual space and form various collective designs in the virtual space.

The specific design may be a specific symbol. The processor may determine the user arrangement pattern is the specific pattern, when a specific symbol pattern corresponding to the specific symbol formed by the designs of the plurality of the parts is detected from the user arrangement pattern.

According to the above, it is possible to determine whether the collective design created by the user contains the specific symbol.

The processor does not have to detect the plurality of the route parts in the user arrangement pattern as the specific symbol pattern when a predetermined design exists in an exception area set for the specific symbol pattern.

According to the above, even if the plurality of parts arranged by the user resembles a specific symbol pattern, it is possible not to detect the plurality of parts as the specific symbol pattern, provided that the predetermined design exists in the exception area defined for the specific symbol pattern. This way, for example, a complex symbol that is hardly recognizable as the specific symbol by users is less likely recognized as the specific symbol.

Further, the specific design may be a specific text string formed by a plurality of characters. The processor may detect, from the user arrangement pattern, one or more character arrangement patterns each corresponding to a single character formed by the designs of a plurality of the parts, and determines that the user arrangement pattern is the specific pattern if the user arrangement pattern includes a plurality of the character arrangement patterns and if a text string indicated by the plurality of the character arrangement patterns is the specific text string.

According to the above, it is possible to determine whether the user arrangement pattern created by the user contains the specific text string.

Further, the processor does not have to detect a plurality of the parts in the user arrangement pattern as the character arrangement pattern when any of the one or more character arrangement patterns has a predetermined design in an exception area defined for each of the one or more character arrangement patterns.

According to the above, even if the plurality of parts arranged by the user resembles a character arrangement pattern, it is possible not to detect the plurality of parts as the character arrangement pattern, provided that the predetermined design exists in the exception area defined for the character arrangement pattern. This way, for example, an arrangement pattern that is hardly recognizable as the character by users is less likely recognized as the character.

Further, the one or more character arrangement patterns may include a first character arrangement pattern corresponding to a first character, and a second character arrangement pattern corresponding to a second character. A total length of the designs of a plurality of the parts constituting the second character arrangement pattern may be longer than a total length of the designs of a plurality of the parts constituting the first character arrangement pattern. When the user arrangement pattern contains a specific character arrangement pattern corresponding to a single character which could be the first character or the second character, the processor may preferentially detect the second character arrangement pattern over the first character arrangement pattern, recognize the specific character arrangement pattern as the second character arrangement pattern, and when a text string indicated by a plurality of the character arrangement patterns including the second character arrangement pattern is the specific text string, determine the user arrangement pattern is the specific pattern.

According to the above, for the plurality of route parts which can form the first character as well as the second character, the information processing system can recognize them as a second character, and for example, recognize as a character that is more easily recognizable by users.

Further, the one or more character arrangement patterns may include a first character arrangement pattern corresponding to a first character, and a second character arrangement pattern corresponding to a second character. The designs of the parts are each a design of a line, and where a connection count of each of the parts represents the number of its ends reached by the design, a total connection count of the parts constituting the second character arrangement pattern may be larger than a total connection count of the parts constituting the first character arrangement pattern. When the user arrangement pattern contains a specific character arrangement pattern corresponding to a single character which could be the first character or the second character, the processor may preferentially detect the second character arrangement pattern over the first character arrangement pattern, recognize the specific character arrangement pattern as the second character arrangement pattern, and when a text string indicated by a plurality of the character arrangement patterns including the second character arrangement pattern is the specific text string, determine the user arrangement pattern is the specific pattern.

According to the above, for the plurality of route parts which can form the first character as well as the second character, the information processing system can recognize them as a second character, and for example, recognize as a character that is more easily recognizable by users.

Further, if the parts in the user arrangement pattern could constitute a character arrangement pattern arranged in a first position or a character arrangement pattern arranged in a second position which is closer to a reference position of the virtual space than the first position, the processor may preferentially recognize the parts as those constituting the character arrangement pattern arranged in the second position, and when a text string indicated by a plurality of the character arrangement patterns including the character arrangement pattern arranged in the second position is a specific text string, determine the user arrangement pattern is the specific pattern.

According to the above, even if the parts arranged by the user constitute parts of a plurality of character arrangement patterns, these parts can be recognized as a part of the character arrangement pattern in the second position closer to the reference position of the virtual space. Therefore, it is possible to preferentially recognize the character arrangement pattern close to the reference position of the virtual space.

Further, the reference position may be a left side position within the virtual space.

According to the above, it is possible to preferentially recognize the character arrangement pattern at a left-side position in the virtual space.

Further, each of the parts may be associated with at least one of a plurality of design types, and the processor may determine whether each of one or more partial collective designs is the specific pattern containing the specific design, the each of the one or more partial collective designs formed by the parts associated with the same design type out of the design types.

According to the above, the determination of whether the partial collective design contains the specific form can be performed for each partial collective design constituted of the single design type.

Further, each of the parts may be associated with one of a plurality of line types which are the plurality of the design types.

According to the above, there is a plurality of line types as the design types, and the above determination of whether the specific form is contained can be performed for each of the line types.

Each of the parts may have a quadrangular shape, and the processor may align and arrange the parts of the quadrangular shape in the virtual space.

According to the above, the collective design can be formed by arranging the parts having a quadrangular shape in the virtual space.

Further, the parts may include at least a first part having a line connecting two opposing sides of the first part as its design, a second part having a line connecting two adjacent sides of the second part as its design, and a third part having a line connecting three sides of the third part as its design.

According to the above, the collective design can be formed by arranging at least three parts.

Further, the information processing system may include a user terminal and a server. The processor may prohibit uploading of the arrangement information from the user terminal to the server to restrict access by another user to the arrangement information.

According to the above, access by another user to the arrangement information can be restricted by prohibiting uploading of the arrangement information to the server.

Further, the user terminal may determine whether the user arrangement pattern is a specific pattern. When the user terminal does not determine the user arrangement pattern is the specific pattern, the processor may upload the arrangement information from the user terminal to the server.

According to the above, the above determination can be performed on the user terminal side, and the processing load of the server can be reduced.

Further, the information processing system may include a user terminal and a server. When the user arrangement pattern is determined as to be the specific pattern, the processor may restrict access by another user to the arrangement information uploaded from the user terminal to the server.

According to the above, restriction of access to the arrangement information can be performed on the server side.

Further, the processor may be configured to arrange a virtual player character in the virtual space, and control a movement of the virtual player character. The collective design formed by the user arrangement pattern may be a traveling path for the virtual player character, in which the designs of the parts are connected to one another, and the processor may move the virtual player character on the collective design.

According to the above, the user can create the collective design which is a traveling path for the virtual player character.

Further, another exemplary embodiment may be a non-transitory computer-readable storage medium having stored therein an information processing program or an information processing apparatus. Further, another exemplary embodiment may be an information processing method executable in an information processing system.

According to the above exemplary embodiment, the user can form a collective design by arranging the parts each associated with a design, in the virtual space. When the collective design created by the user contains the specific design, access by another user to the collective design can be restricted.

These and other objects, features, aspects and advantages will become more apparent from the following detailed description when taken in conjunction with the accompanying drawings.

BRIEF DESCRIPTION OF THE DRAWINGS

FIG. 5 is an example non-limiting diagram showing a plurality of exemplary route parts that constitute the game world.

FIG. 7 is an example non-limiting diagram showing exemplary basic parts and parts considered to be identical thereto.

FIG. 15 is an example non-limiting diagram for explaining an overview of connection count preferential recognition processing.

FIG. 16 is an example non-limiting diagram showing exemplary data stored in a game system 1.

FIG. 20 is an example non-limiting flowchart showing exemplary forbidden word determination processing of step S206.

DETAILED DESCRIPTION OF NON-LIMITING EXAMPLE EMBODIMENTS

Figure 1:
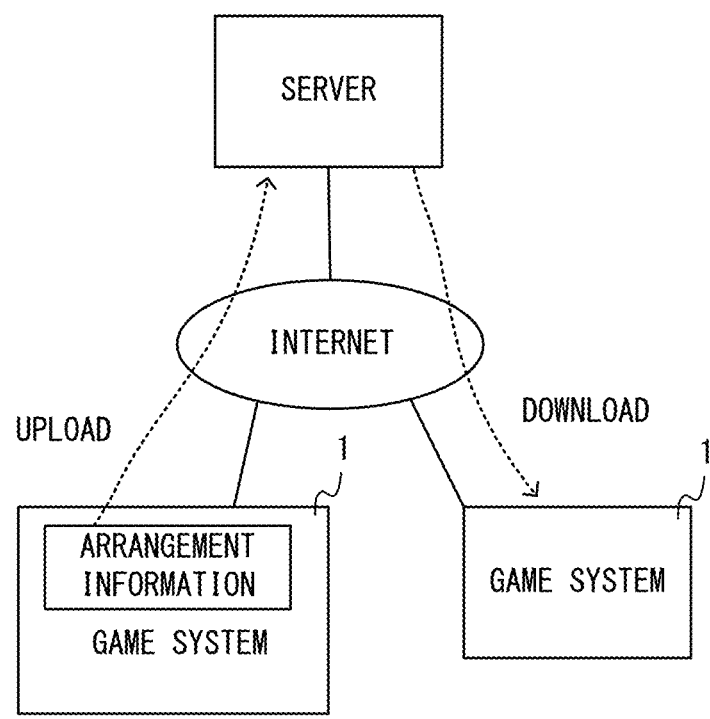
FIG. 1 is an example non-limiting diagram showing an exemplary information processing system according to an exemplary embodiment.

An information processing system according to an exemplary embodiment is described below. FIG. 1 is a diagram showing an example of the information processing system according to the exemplary embodiment.

As illustrated in FIG. 1, the information processing system includes a server and a plurality of game systems (game apparatuses). The server includes a CPU (not shown), a memory, and a storage device such as a hard disk, and is configured to be able to communicate with the plurality of game systems 1 via the internet.

Each of the game systems 1 is operated by a user of that game system 1. The game system 1 generates arrangement information related to an arrangement of a plurality of route parts, in response to an arrangement operation by the user. This will be detailed later. The user can publish arrangement information he/she generated, by uploading the generated arrangement information to the server. The server stores, in its storage device, the arrangement information uploaded. The arrangement information uploaded to the server can be downloaded by another user. Then, the other user can play a game based on the downloaded arrangement information.

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4, and also functions as an information processing system. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment is described, and then, the control of the game system 1 according to the exemplary embodiment is described.

Figure 2:
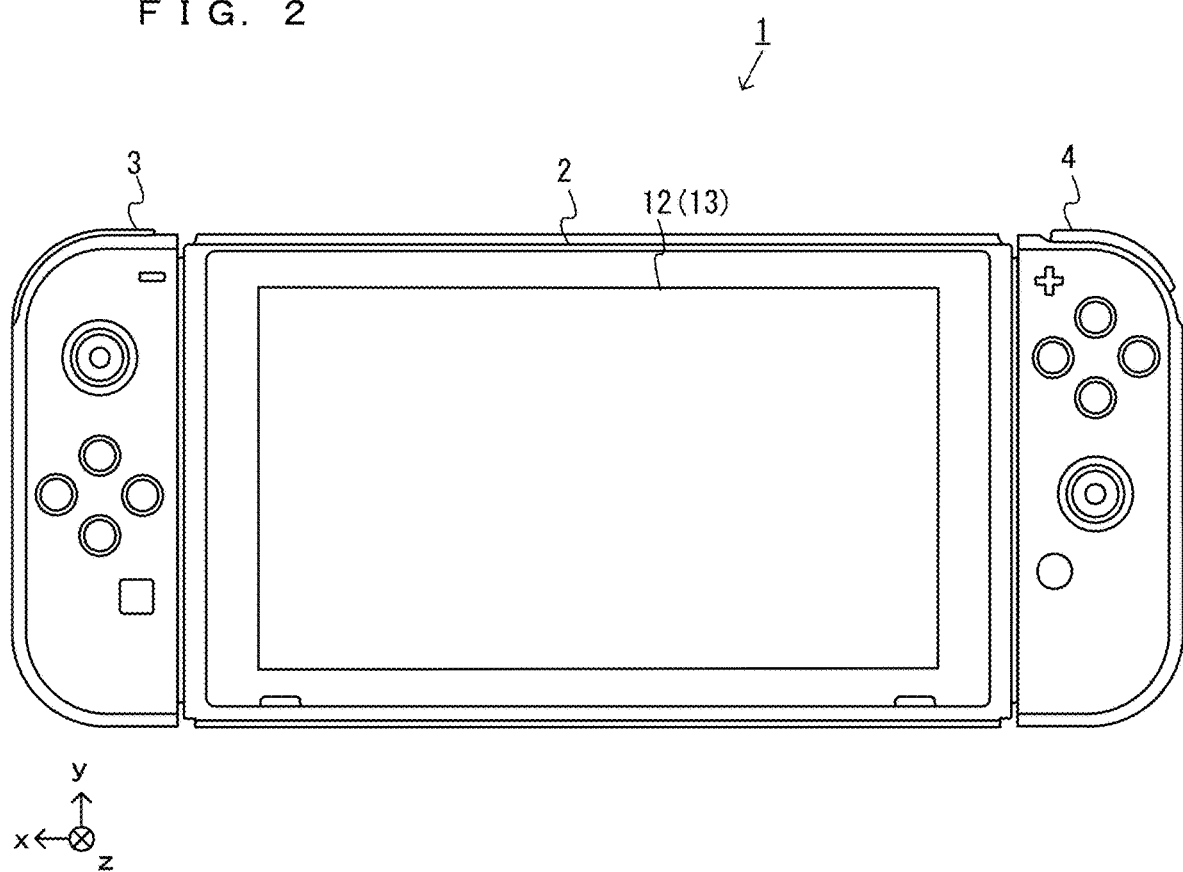
FIG. 2 is an example non-limiting diagram showing an exemplary state where a left controller 3 and a right controller 4 are attached to a main body apparatus 2.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections (a plurality of buttons to be pressed, an analog stick which allows instructions related to directions, and the like) with which a user provides inputs.

As shown in FIG. 2, the main body apparatus 2 includes the display 12. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

Figure 3:
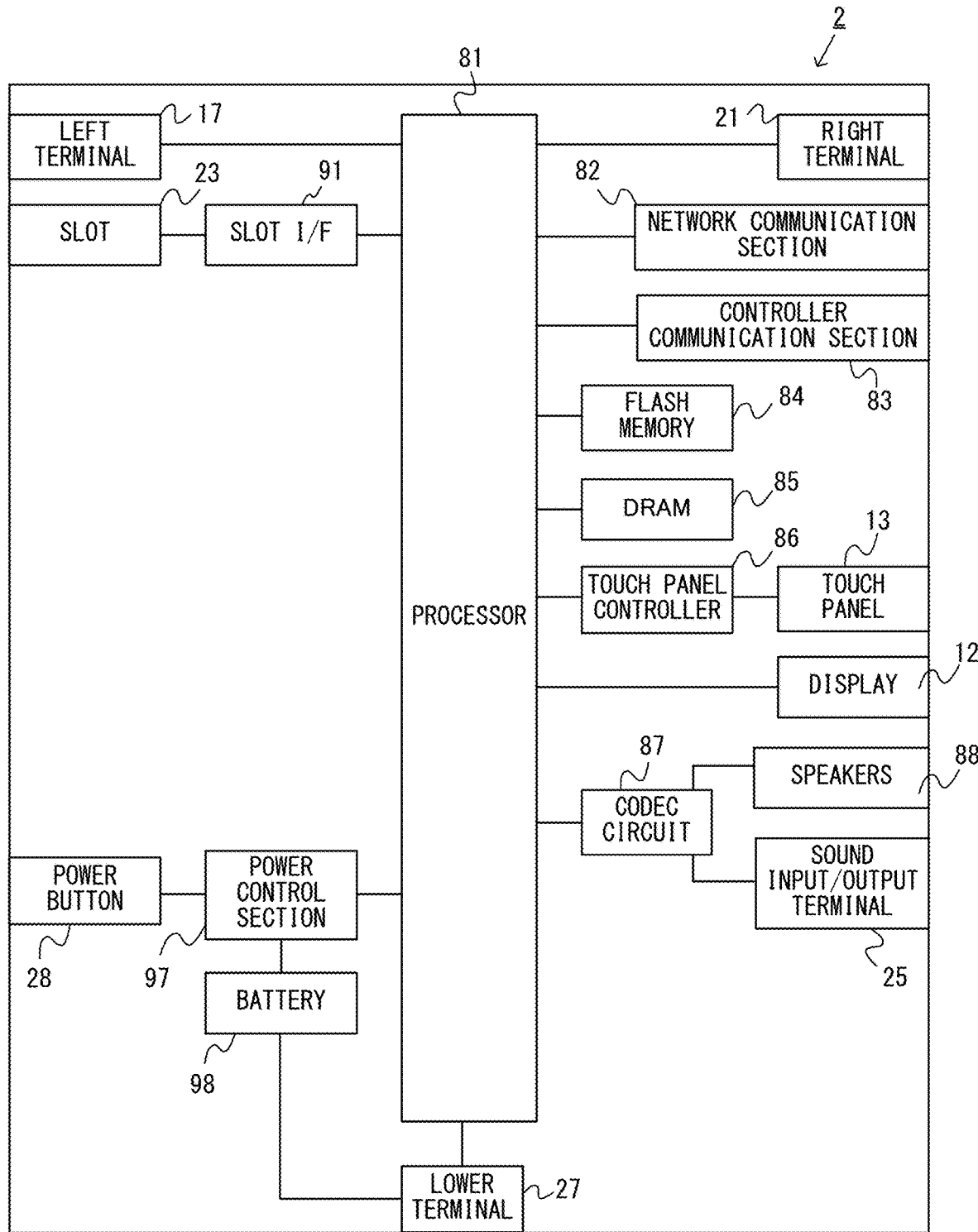
FIG. 3 is an example non-limiting block diagram showing an exemplary internal configuration of the main body apparatus 2.

FIG. 3 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

(Overview of Game Processing)

Figure 4:
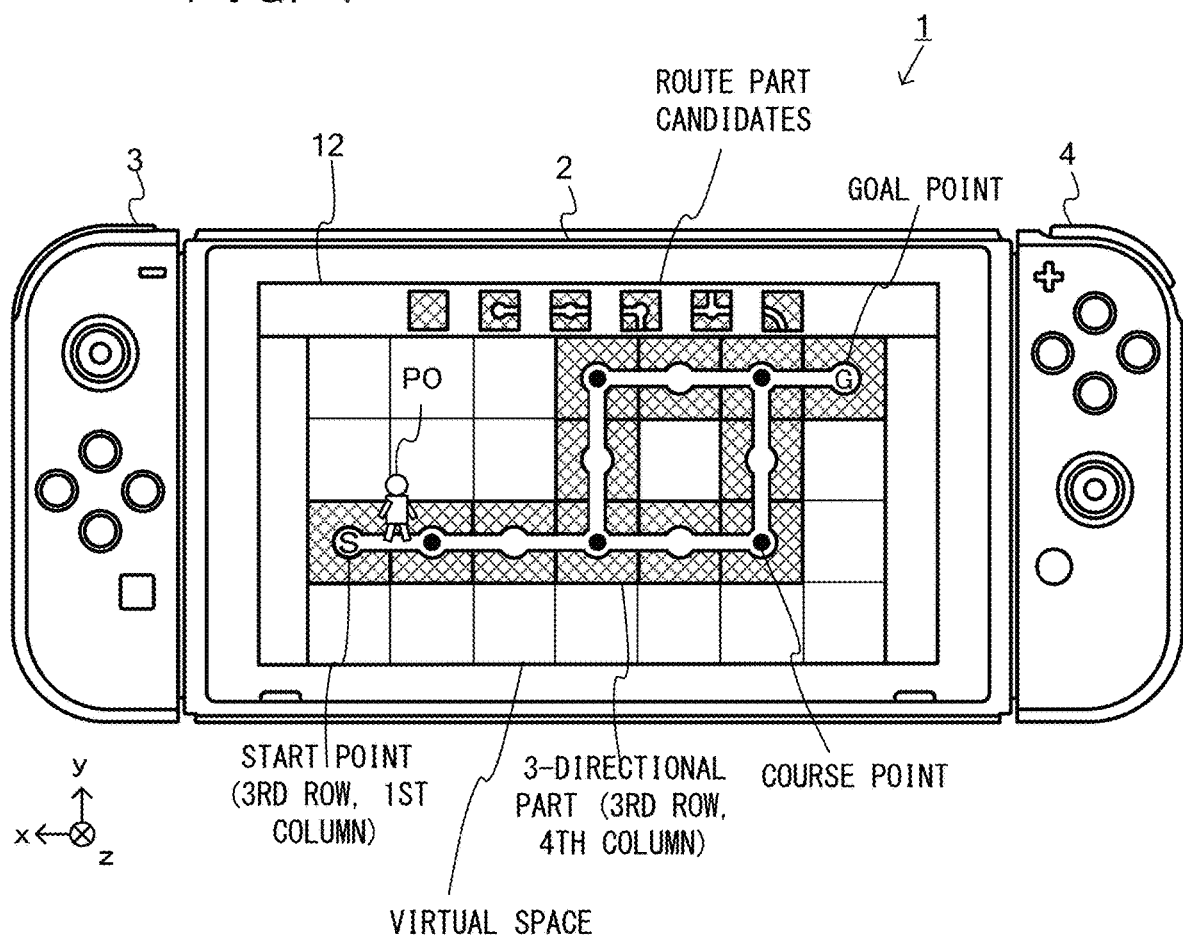
FIG. 4 is an example non-limiting diagram showing an exemplary game world creation screen out of game images to be displayed on a display 12 of the main body apparatus 2, the game world creation screen being a screen for creating/editing a desirable game world in a virtual space.

An overview of game processing performed in the game system 1 is described below with reference to FIG. 4. FIG. 4 is a diagram showing an exemplary game world creation screen out of game images to be displayed on the display 12 of the main body apparatus 2. The game world creation screen is a screen for creating/editing a desirable game world in a virtual space. Note that the following description deals with a case where the game system 1 executes a game application program as an exemplary application program. However, another application program may be executed in the game system 1.

In FIG. 4, the display 12 of the game system 1 displays a game image for creating/editing a game world used in a game to be played on the game system 1. For example, the game world in this exemplary embodiment is represented by an image showing a route from a movement start position (start point; indicated by the character "S" in FIG. 4) to a reaching target position (goal point; indicated by the character "G" in FIG. 4). A player object PO (a virtual player character) arranged in the virtual space moves from the start point to the goal point along the route, in response to a user operation. Specifically, as shown in FIG. 4, the route from the start point to the goal point may be branched, and a course point (each of the solid black circles in FIG. 4) may be set in a position along the route. The course point herein is a position that allows the user to play a game using at least one game stage in a dimension apart from the game world, by having the player object PO reaching that position. By clearing all the game stages set in the course point, the player object PO is able to pass the course point and move towards the goal point along the route. The game using this game world is cleared when the player object PO reaches the goal point in the game world.

In this exemplary embodiment, the start point and the goal point are set in advance in the virtual space. The user is able to create/edit the route from the start point to the goal point. For example, the entire virtual space displayed on the display 12 is divided into a grid of a plurality of cells (a grid of cells aligned in 4 rows and 7 columns in the example of FIG. 4). A plurality of types of route parts arrangeable in the grid are prepared in advance, and the user is able to form a route in the virtual space by arranging the route parts in the grid of the virtual space. In this exemplary embodiment, the entire virtual space is divided into a grid of square cells having the same size, and there are square route parts that can be arranged in each cell of the grid. Note that, although the present exemplary embodiment deals with a case where a 2-dimensional game world is formed by 2-dimensionally arranging 2-dimensional route parts, another exemplary embodiment is also possible, in which a 3-dimensional game world is formed by 3-dimensionally arranging 3-dimensional parts.

Each route part has thereon a route image (design) that constitutes a part of a route. By arranging the plurality of route parts in the virtual space, the route images of the route parts are connected with one another, thereby forming a route from the movement start position to the reaching target position (collective design). For example, there is a plurality of landforms to be formed on the game world. Examples of such landforms include a field, an underground, a desert, a forest, a snowfield, a sky, an ocean, a space, a volcano. In this exemplary embodiment, a plurality of the route parts are prepared for each landform. For example, there are a plurality of route parts corresponding to the field and a plurality of route parts corresponding to the snowfield. The following describes exemplary route parts with reference to FIG. 5.

FIG. 5 is a diagram showing a plurality of the route parts constituting the game world. As shown in FIG. 5, the route parts constituting the game world includes two types of route parts which are main route parts and sub route parts. The main route parts are mainly parts for forming a route along which the player object moves, and constitute a part of the landform. Each of the main route parts includes a background image according to the landform (e.g., a green background image indicating the field, a white background image indicating a snowfield) and a route image of a solid line. Further, the sub route parts are parts that form a bypass route for the player object, and includes a background image according to the landform (e.g., a blue background image indicating the ocean), and a route image of a dotted line. Arranging a plurality of the main route parts in the virtual space forms a route of a solid line, and arranging a plurality of the sub route parts in the virtual space forms a route of a dotted line.

As shown in FIG. 5, each type of the route part includes a plurality of the route parts having the route images (designs) of different shapes. Specifically, the main route parts and the sub route parts each include a non-directional part, a 1-directional part, a 2-directional I-shaped part, a 2-directional L-shaped part, a 3-directional part, and a curved part.

The non-directional part is a part that constitutes the landform, and has no route images (designs) drawn thereon. The non-directional part does not form a route, and is an area in which the player object is not able to move thereto.

The 1-directional part is connectable with another route part. One of four sides of the square shape of the 1-directional part is set as the connecting direction, and has thereon a route image with a dead end (half-penetrating straight line design). The "connecting direction" herein means a direction in which the route image extends from the center of the route part to a side of the route part, and is set on a side where the route image is reached. In the example shown in FIG. 5, the route image of the 1-directional part extends from the center of the square to the right side, and the connecting direction is set on the right side. When two route parts are arranged adjacent to each other, and the connecting directions of the two route parts contact each other, the route images of the two route parts are connected. That is, the connecting direction can be perceived as the position of the side connectable to the route image of another route part, with the center of the route part as the reference. Further, the connection count of the 1-directional part is "1". The "connection count" herein indicates a number of sides of the route part where the route image has reached, and is the number of connectable route images on adjacent route parts.

Further, the 1-directional part is configured to be rotatable, and its arrangement direction (rotation angle) can be any one of 0 degrees, 90 degrees, 180 degrees, and 270 degrees. Rotating the 1-directional part changes the connecting direction. Note that FIG. 5 shows each route part with their rotation angles set at 0 degrees. For example, when the rotation angle of the 1-directional part shown in FIG. 5 is set at 90 degrees, the connecting direction of that 1-directional part is downward (lower side).

The 2-directional I-shaped part is a route part having the connecting direction set on two opposing sides out of the four sides of the square shape, and has a straight route image (I-shaped design) drawn thereon. The route image extends from the center of the 2-directional I-shaped part to two sides, and the connection count of the 2-directional I-shaped part is therefore "2". Further, the 2-directional I-shaped part is configured to be rotatable, and its arrangement direction (rotation angle) can be any one of 0 degrees, 90 degrees, 180 degrees, and 270 degrees.

The 2-directional L-shaped part is a route part having the connecting direction set on two adjacent sides out of the four sides of the square shape, and has a perpendicularly bent route image (L-shaped design) drawn thereon. The connection count of the 2-directional L-shaped part is "2". Further, the 2-directional L-shaped part is configured to be rotatable, and its arrangement direction (rotation angle) can be any one of 0 degrees, 90 degrees, 180 degrees, and 270 degrees.

The 3-directional part is a route part having the connecting direction set on three sides out of the four sides of the square shape, and has a T-shaped route image (T-shaped design) drawn thereon. The route image extends from the center of the 3-directional part to three sides, and the connection count of the 3-directional part is therefore "3". Further, the 3-directional part is configured to be rotatable, and its arrangement direction (rotation angle) can be any one of 0 degrees, 90 degrees, 180 degrees, and 270 degrees.

The curved part is a route part having the connecting direction set on two adjacent sides out of the four sides of the square shape, and has a curved route image (curved design) drawn thereon. The route image extends from the center of the curved part to two sides, and the connection count of the curved part is therefore "2". Further, the curved part is configured to be rotatable, and its arrangement direction (rotation angle) can be any one of 0 degrees, 90 degrees, 180 degrees, and 270 degrees.

As described, the 1-directional part, the 2-directional I-shaped part, the 2-directional L-shaped part, the 3-directional part, and the curved part have designs of different shapes (route images), respectively. Each of the main route parts and the corresponding sub route part both have a design of the same shape. However, the form of displaying the design is different between the main route part and the sub route part. Namely, the design on the main route part is a solid line, whereas the design of the sub route part is dotted line.

Note that illustration of FIG. 5 is no more than an example, and other route parts may be prepared. For example, a route part with a cross-shaped route image drawn thereon may be further prepared.

Further, the plurality of main route parts and the plurality of sub route parts shown in FIG. 5 are prepared according to the landform. Although the background images of the route parts are different according to the landform, the route images of the route parts are common to each of the landforms. That is, no matter what landform the main route part forms, the route image in the main route part is drawn by a solid line. Further, no matter what landform the sub route part forms, the route image in the main route part is drawn by a dotted line.

Note that the form of displaying the route images of the main route parts and the sub route parts may be different according to the landform. For example, the route image of the main route part representing the landform of a field may be drawn in green, and the route image of the main route part representing the landform of a snowfield may be drawn in white. A single game world (screen) may include only route parts indicating a single landform. Further, a single game world may contain the route parts indicating a plurality of landforms. In this case, for example, a green route (field landform) may be drawn on the right side of the screen, and a white route (snowfield landform) may be drawn on the left side of the screen.

The user is able to arrange a route part selected out of the plurality of route parts prepared in advance, in such a manner as to coincide with a cell of the grid in the virtual space. Then, for route parts arranged adjacent to each other, if the connecting direction is set on both sides of the route parts in contact with each other, that is, if sides set as the connecting direction are connected with each other, the route images of the route parts are connected.

The arrangement position and arrangement direction of the route part selected by the user are set by a user operation. For example, the arrangement position and the arrangement direction of the route part are set by a touch operation using the touch panel 13. The user can arrange each route part in a desirable cell of the grid by touching on the route part and dragging the same. Tapping the route part after arrangement of the route part rotates and changes the arrangement direction of the route part by 90 degrees at a time, in a predetermined direction (e.g., clockwise direction).

For example, the user touches on the 1-directional part and drag it to the cell in the 3rd row and the 1st column, which is set as the start point as in the example shown in FIG. 4, thereby arranging the 1-directional part to the cell in the 3rd row and the 1st column of the grid. Next, the user drags the 2-directional I-shaped part to the adjacent cell on the right side (in the 3rd row, 2nd column) of the grid. Then, these two route parts (main route parts) are connected to each other, and forms a route along which the player object PO can move. Further, the 2-directional I-shaped part is arranged at the cell of the 3rd row and 3rd column, and the 3-directional part is arranged at the cell of the 3rd row and 4th column. Further, after arranging the 2-directional I-shaped part at the cell of the 3rd row and 5th column and another 2-directional I-shaped part at the cell of the 2nd row and 4th column, the other 2-directional I-shaped part is tapped once to rotate the other 2-directional I-shaped part by 90 degrees. This way, the route, along which the player object PO can move, is branched upward and rightward directions from the cell of the 3rd row and 4th column.

By arranging the plurality of route parts having different route images (designs) in the virtual space, a route (collective design) from the start point to the goal point is formed. The game world including the route formed by the user is represented as an arrangement pattern of the plurality of route parts. Here, the "arrangement pattern" is information containing arrangement position of each route part, the design (route image) of each route part, and arrangement direction (rotation information) of each route part. When a route is created through the arrangement operation by the user, the arrangement information representing the arrangement pattern created by the user (hereinafter, user arrangement pattern) is stored in a storage medium of the game system 1 (e.g., a flash memory 84, a DRAM 85, an external storage medium attached to the slot 23, and the like). The game system 1 arranges each route part in the virtual space based on the arrangement information stored in the storage medium to form the game world created/edited by the user. The user can progress the game by moving the player object PO in the game world.

Further, as hereinabove described, the user (first user) can upload, to the server, the arrangement information so as to publish that arrangement information representing the user arrangement pattern created by the user. The server allows another user (second user) to access the arrangement information uploaded by the first user. The second user can access the server by using his/her own game system 1 and download (retrieve) the arrangement information uploaded by the first user. The second user can play a game using the game world including the route created by the first user, by having the game system 1 of the second user read the arrangement information downloaded.

Here, the user is able to form various routes by using a plurality of the route parts each having the route image drawn thereon in the form of a line. For example, the user may form a route that looks like a character or a symbol.

Figure 6:
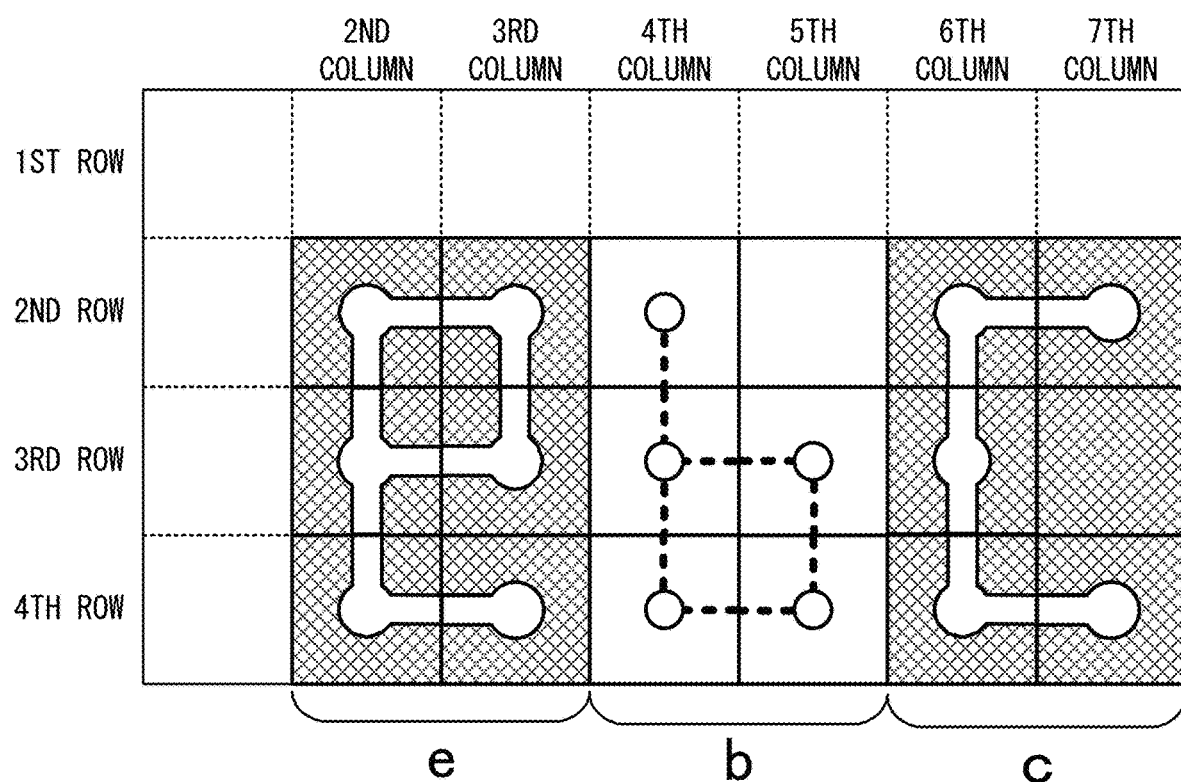
FIG. 6 is an example non-limiting diagram showing an exemplary route looking like a character, which is formed by a plurality of route parts.

FIG. 6 is a diagram showing an exemplary route looking like a character, which is formed by a plurality of the route parts. For example, FIG. 6 shows a route (partial collective design) that looks like the character "e", which is formed by six main route parts arranged in the 2nd row and 2nd column, the 2nd row and 3rd column, the 3rd row and the 2nd column, the 3rd row and 3rd column, the 4th row and 2nd column, and the 4th raw and 3rd column. Note that the positions specified as the "n-th row and m-th column" are hereinafter expressed as (n, m).

Further, there is a route (partial collective design) that looks like the character "b", which is formed by five sub route parts arranged in the positions of (2, 4), (3, 4), (3, 5), (4, 4), and (4, 5). Further, there is a route (partial collective design) that looks like the character "C", which is formed by five main route parts arranged in the positions of (2, 6), (2, 7), (3, 6), (4, 6), and (4, 7). As a result, the route formed by these 16 route parts looks like a text string "ebC".

Here, in this exemplary embodiment, a route including a specific text string or a symbol is restricted from being published. Specifically, the user arrangement pattern created by the user is checked to determine whether the collective design formed by the designs on the plurality of the route parts is a specific pattern containing a specific design. The specific design is, for example, a design representing a forbidden word or forbidden symbol registered in advance. If the user arrangement pattern is the specific pattern, the arrangement information representing the user arrangement pattern is prohibited from being uploaded from the game system 1 to the server. If, on the other hand, the user arrangement pattern is not the specific pattern, the arrangement information representing that user arrangement pattern is allowed to be uploaded from the game system 1 to the server.

(Restriction of Uploading Forbidden Word)

The following describes restriction of uploading forbidden words (examples of the specific design), which is executed when a route is created by a user.

(Definition of Character Arrangement Pattern)

In this exemplary embodiment, a character arrangement pattern corresponding to a single character (including numbers) is defined for each character. The "character arrangement pattern" herein is an arrangement pattern of a plurality of the route parts such that the route formed by the arrangement of the route parts looks like a single predetermined character. The character arrangement pattern includes the arrangement position, the design, and the arrangement direction of each route part as its element. For example, there are pre-defined character arrangement patterns for the character "e", the character "b", and the character "C", as shown in FIG. 6.

When a user arrangement pattern is created by the user, character detection is performed to detect a pre-defined character arrangement pattern from the user arrangement pattern. In this exemplary embodiment, the character detection is performed separately for the main route parts (route images of solid lines) and for the sub route parts (route images of dotted lines). Specifically, the character detection is performed by determining whether a plurality of the main route parts match with any of the pre-defined character arrangement patterns. Further, the character detection is performed by determining whether a plurality of the sub route parts match with any of the pre-defined character arrangement patterns. In other words, in this exemplary embodiment, a plurality of the route parts having a mix of the main route parts and the sub route parts are not considered as to form a single character. That is, in this exemplary embodiment, the character detection is performed for each partial collective design formed by a plurality of the route parts (a plurality of the route parts of a single type) corresponding to a single design type (display form of the route image).

Here, in the character detection, if a plurality of the route parts constituting a group of the route parts (hereinafter, a route part group) are the same as the route parts constituting any of the pre-defined character arrangement patterns, that route part group is detected as that character arrangement pattern.

FIG. 7 is a diagram showing an example of basic parts and parts considered to be identical thereto. As shown in FIG. 7, in the character detection, a plurality of parts listed on the right side are considered to be identical to the basic parts (A) to (C) on the left side. In other words, at the time of detecting the character arrangement pattern, the "basic parts" on the left side can replace parts listed on the right side as "parts considered to be identical". The plurality of parts listed on the right side are the main route parts shown in FIG. 5 each of which is rotated by an appropriate angle.

Specifically, the 2-directional I-shaped part (a-1) of 90 degrees in the rotation angle, the 2-directional L-shaped part (a-2) of 270 degrees in the rotation angle, and the 3-directional part (a-3) of 180 degrees in the rotation angle are each considered to be a route part identical to the 1-directional part (A) of 0 degrees in the rotation angle. That is, the connecting direction of the 1-directional part (A) is a right direction and this 1-directional part (A) is replaceable with another part with its right direction set as a connecting direction.

Further, the 3-directional part (b-1) of 180 degrees in the rotation angle and the 3-directional part (b-2) of 0 degrees in the rotation angle are each considered to be a route part identical to the 2-directional I-shaped part (B) of 0 degrees in the rotation angle. Further, the 3-directional part (c-1) of 180 degrees in the rotation angle and the curved part (c-2) of 0 degrees in the rotation angle are each considered to be a route part identical to the 2-directional L-shaped part (C) of 0 degrees in the rotation angle. Further, the 2-directional L-shaped part (d-1) is considered to be identical to the curved part (D).

Note that FIG. 7 shows route parts of 0 degrees in the rotation angle as the basic parts. However, the same applies to a case where the basic parts are rotated. That is, in a case where the "basic parts" on the left side of FIG. 7 are rotated, the "parts considered to be identical" are rotated by the same angle. For example, the parts (a-1) to (a-3) rotated by 90 degrees are considered to be identical to the 1-directional part rotated by 90 degrees. Further, the parts (b-1) or (b-2) rotated by 90 degrees are considered to be identical to the 2-directional I-shaped part rotated by 90 degrees.

Figure 8:
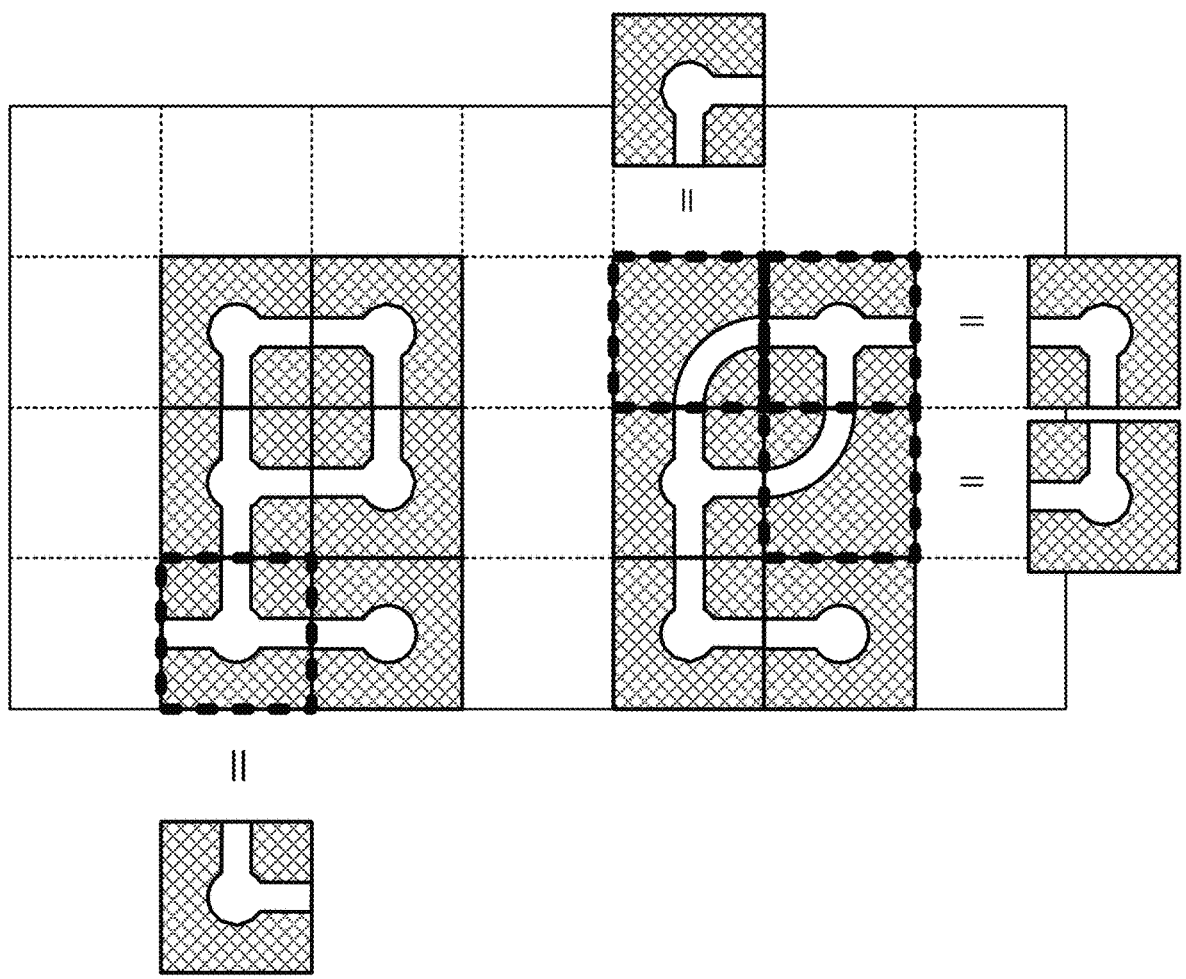
FIG. 8 is an example non-limiting diagram showing an exemplary route part group constituted of parts considered to be identical, and illustrates an exemplary route part group recognized as the character "e".

FIG. 8 is a diagram showing an exemplary route part group constituted of parts considered to be identical, and shows an exemplary route part group recognized as the character "e". The pre-defined character arrangement pattern corresponding to the character "e" is, for example, an arrangement pattern including six route parts shown on the left side of FIG. 6. Note that the character arrangement pattern corresponding to the character "e" is not limited to the pattern including the six route parts shown on the left side of FIG. 6, and a plurality of character arrangement patterns may be defined.

Here, when the six route parts shown on the left side of FIG. 6 and six route parts on the left side of FIG. 8 are compared, the only difference is the route part at (4, 2) of FIG. 8 (parts surrounded by dotted line). This route part at (4, 2) is the 3-directional part with the connecting direction set on the left, upper, and right sides thereof, and is a design identical to (c-1) of FIG. 7 rotated by 180 degrees. For this reason, this route part at (4, 2) is considered to be identical to the 2-directional L-shaped part which is (C) of FIG. 7 rotated by 180 degrees. The six route parts on the left side of FIG. 8 are therefore considered to be identical to the six route parts on the left side of FIG. 6, and are recognized as the character "e".

Similarly, when the six route parts shown on the left side of FIG. 6 and six route parts on the right side of FIG. 8 are compared, the route parts at (2, 5), (2, 6), and (3, 6) are different. The curved part arranged at (2, 5) is considered to be identical to the 2-directional L-shaped part of 270 degrees in the rotation angle. The 3-directional part arranged at (2, 6) is considered to be identical to the 2-directional L-shaped part of 0 degrees in the rotation angle. Further, the curved part arranged at (3, 6) is considered to be identical to the 2-directional L-shaped part of 90 degrees in the rotation angle. The six route parts on the right side of FIG. 8 are therefore considered to be identical to the six route parts on the left side of FIG. 6, and are recognized as the character "e".

As described, even if the route part group constituted of a plurality of the route parts arranged by the user does not perfectly match with the pre-defined character arrangement pattern, the route part group is recognized as the character corresponding to the character arrangement pattern as long as the route part group is constituted of route parts considered to be identical.

(Exception Area)

Here, each character arrangement pattern has an exception area. This exception area is described hereinbelow.

Figure 9:
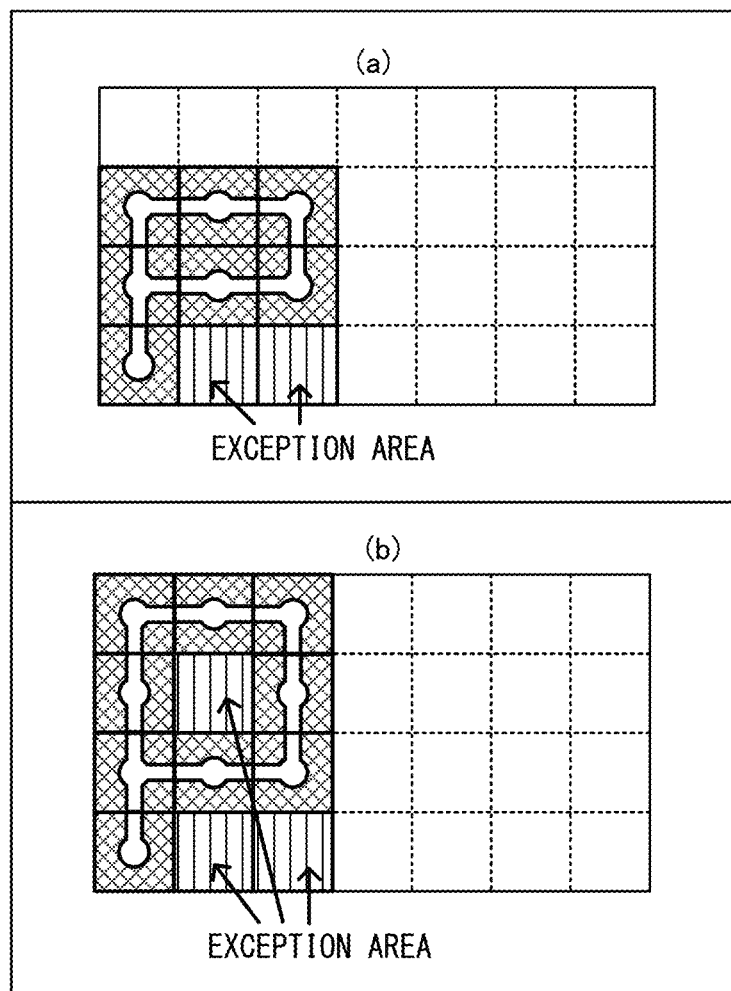
FIG. 9 is an example non-limiting diagram showing an exemplary exception area defined for each character arrangement pattern.
Figure 10:
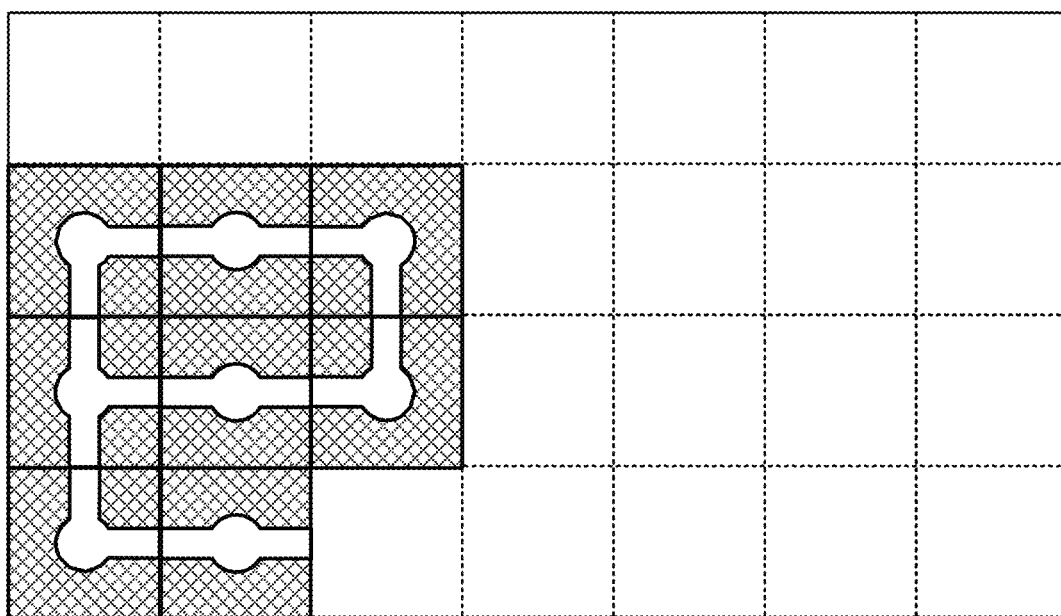
FIG. 10 is an example non-limiting diagram showing an exemplary pattern not recognized as the character "P" because the route extends into the exception area.
Figure 11:
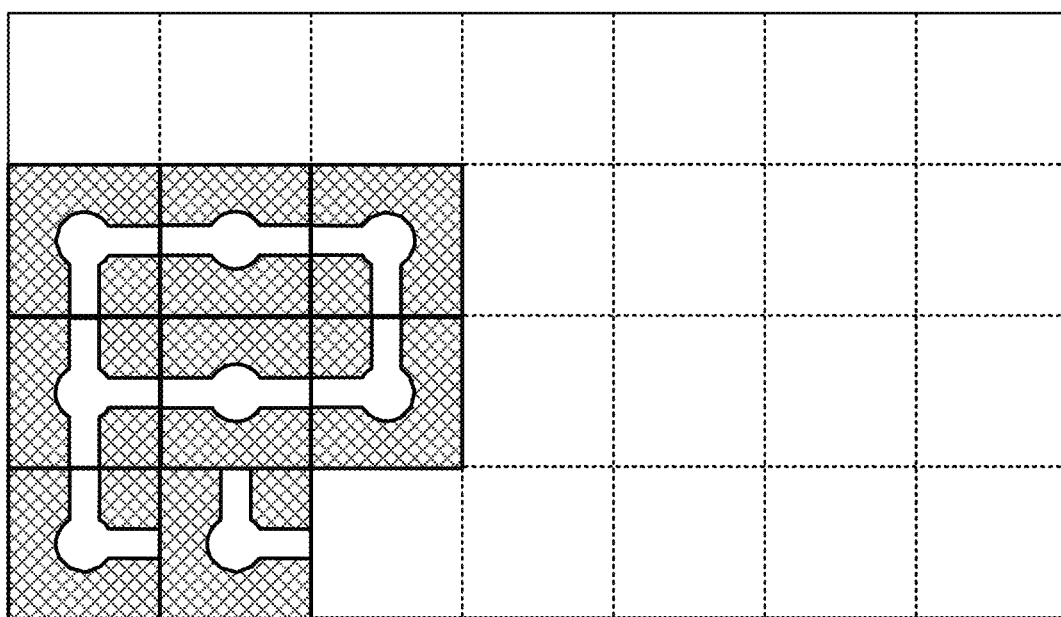
FIG. 11 is an example non-limiting diagram showing an exemplary pattern recognized as the character "P" because the route does not extend into the exception area.

FIG. 9 shows an exemplary exception area defined for each character arrangement pattern. FIG. 10 shows an exemplary pattern not recognized as the character "P" because the route extends to the exception area. FIG. 11 shows an exemplary pattern recognized as the character "P" because the route does not extend to the exception area.

The (a) and (b) of FIG. 9 show character arrangement patterns corresponding to the characters "p" and "P". Note that, in FIG. 9, the positions of the plurality of the route parts in each character arrangement pattern appear to be expressed in absolute positions (positions expressed as the n-th row and m-th column) in the virtual space. However, the positions of the route parts are actually defined as a relative position. Therefore, for example, even if each route part illustrated in the (a) of FIG. 9 is shifted rightward by 1 or more cells of the grid, the pattern remains the same as the pattern of the (a) of FIG. 9.

As shown in FIG. 9, each character arrangement pattern has an exception area.

The exception area is an area such that, if a route extends into the exception area of a character arrangement pattern, that character arrangement pattern is not recognized as a character corresponding to the character arrangement pattern. For example, the character arrangement pattern shown in the (a) of FIG. 9 forms the character "P" with seven route parts in positions of (2, 1), (2, 2), (2, 3), (3, 1), (3, 2), (3, 3), and (4, 1). In this character arrangement pattern, the exception area is set in the positions of (4, 2) and (4, 3). If a route part is arranged in the exception area and the route image on the route part arranged in the exception area connects with the route image of another route part constituting the character arrangement pattern, the route part group constituted of these eight route parts is not recognized as the character "P".

For example, as shown in FIG. 10, six route parts arranged at positions (2, 1), (2, 2), (2, 3), (3, 1), (3, 2), and (3, 3) match with six route parts arranged in the same positions as the (a) of FIG. 9. Further, the 2-directional L-shaped part arranged at (4, 1) of FIG. 10 is considered to be identical to the 1-directional part (1-directional part with its upper side set as the connecting direction) rotated by 270 degrees. Therefore, if the exception area is not considered, the seven route parts in FIG. 10 is recognized as the character "P". However, in FIG. 10, the 2-directional I-shaped part is arranged at (4, 2) which connects to the 2-directional L-shaped part at (4, 1), and the route extends into the exception area from the (4, 1). Therefore, these eight route parts arranged at (2, 1), (2, 2), (2, 3), (3, 1), (3, 2), (3, 3), (4, 1), and (4, 2) are not recognized as the character "P". As described, if the route extends into the exception area set for the character arrangement pattern, the character arrangement pattern no longer looks like, and is not recognized as, the character corresponding to the character arrangement pattern.

On the other hand, although a pattern shown in FIG. 11 has a 2-directional L-shaped part arranged at (4, 2) set as the exception area, the 2-directional L-shaped part at (4, 2) does not connect neither of the route parts arranged at (4, 1) and (3, 2). That is, the route does not extend from the area constituting the character "P" into the exception area. Therefore, these seven route parts arranged at (2, 1), (2, 2), (2, 3), (3, 1), (3, 2), (3, 3), and (4, 1) are normally recognized as the character "P". As described, if the route does not extend into the exception area set for a character arrangement pattern, the character arrangement pattern is recognized as the character corresponding to the character arrangement pattern.

(Preferential Recognition of Character)

Next, preferential recognition is described. In this exemplary embodiment, left-preferential recognition processing and connection count preferential recognition processing are performed to recognize a plurality of the route parts as a character. Each of these processings is described hereinbelow.

Figure 12:
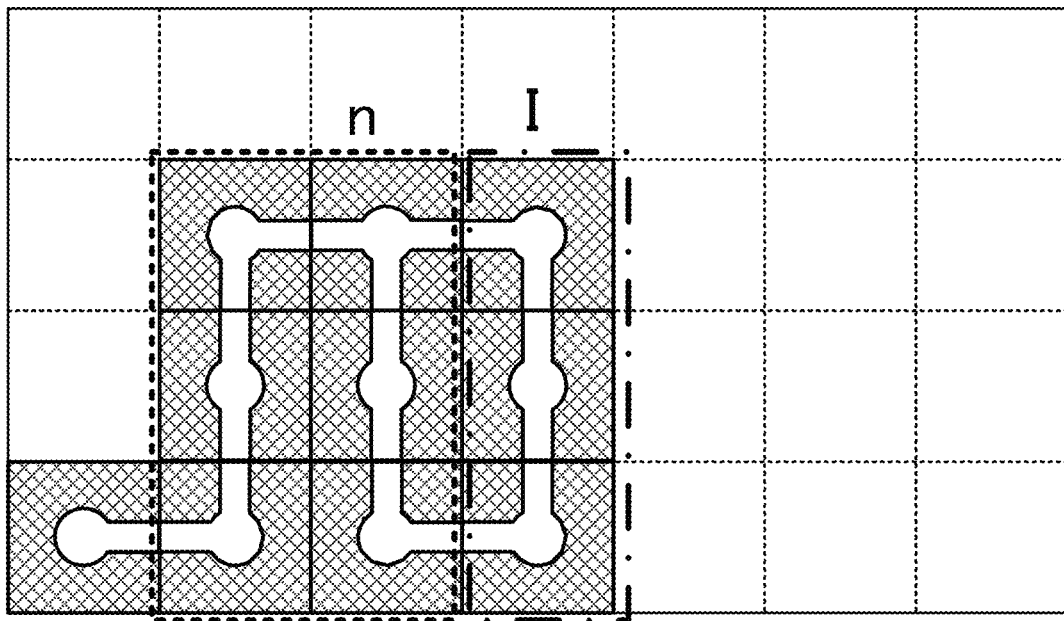
FIG. 12 is an example non-limiting diagram showing an example character recognition in a case of not performing left-preferential recognition processing.
Figure 13:
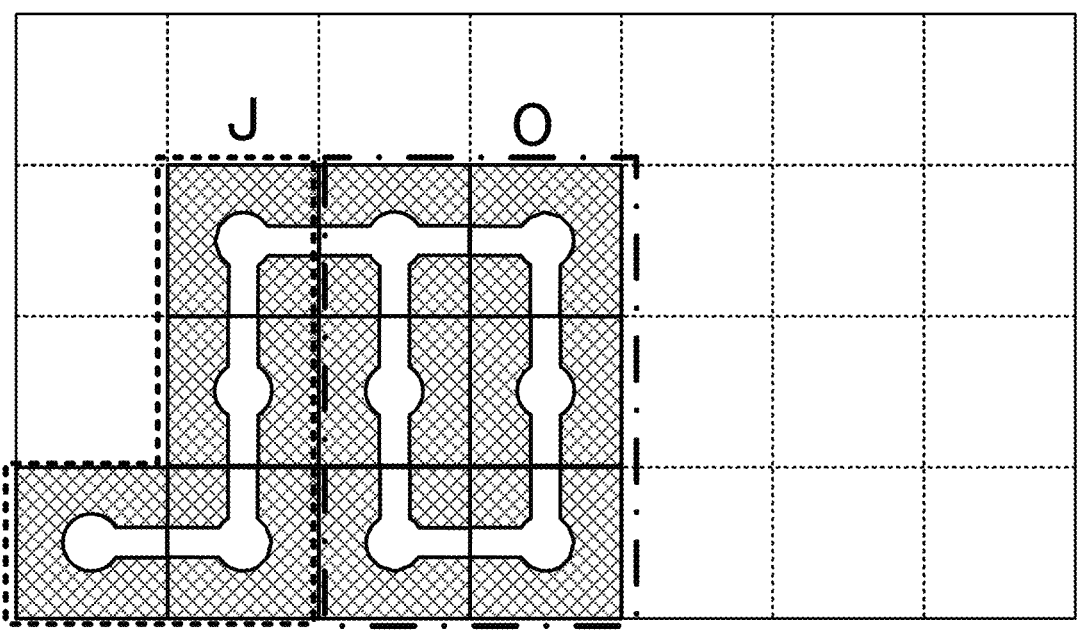
FIG. 13 is an example non-limiting diagram showing an example character recognition in a case of performing the left-preferential recognition processing.

FIG. 12 is an example character recognition in a case of not performing the left-preferential recognition processing. FIG. 13 is an example character recognition in a case of performing the left-preferential recognition processing.

The route parts as shown in FIG. 12 are arranged at (4, 1), (2, 2), (3, 2), (4, 2), (2, 3), (3, 3), (4, 3), (2, 4), (3, 4), and (4, 4). In the case of not performing the left-preferential recognition processing, a route part group in this arrangement pattern constituted of six route parts (i.e., route parts at (2, 2), (3, 2), (4, 2), (2, 3), (3, 3), and (4, 3)) may be recognized as a character arrangement pattern corresponding to the character "n". When this route part group including these six route parts is recognized as the character "n", a remaining route part at (4, 1) on the left side of the route part group does not constitute any character. Further, three route parts at (2, 4), (3, 4), (4, 4) surrounded by a one dot chain line on the right side of the route part group may be recognized as the character "I".

On the other hand, in the case of performing the left-preferential recognition processing, the character detection is performed preferentially to an area closer to the lower left of the virtual space. For example, as shown in FIG. 13, the four route parts at (4, 1), (4, 2), (3, 2), and (2, 2) surrounded by a dotted line match with (or considered to be identical to) a pre-defined character arrangement pattern corresponding to the character "J". Therefore, these four route parts are recognized as the character arrangement pattern corresponding to the character "J". Then, the character detection is performed excluding these four route parts. As a result, the six route parts (the route parts at (2, 3), (3, 3), (4, 3), (2, 4), (3, 4), and (4, 4)) surrounded by a one dot chain line in FIG. 13 are recognized as a character arrangement pattern corresponding to the character "O". Therefore, the arrangement pattern shown in FIG. 13 is recognized as a text string "JO".

As described, in this exemplary embodiment, when a plurality of the route parts arranged in certain positions are included in the route parts constituting a plurality of character arrangement patterns, the left-preferential recognition processing is performed to preferentially detect the character arrangement pattern closer to the lower-left position of the virtual space. Specifically, in this exemplary embodiment, a plurality of the route parts included in the user arrangement pattern could constitute a character arrangement pattern arranged in a first position as well as a character arrangement pattern arranged in a second position. In such a case, these route parts are considered as the route parts constituting the character arrangement pattern arranged in the second position which is closer to the lower left of the virtual space. That is, when the character arrangement pattern in the first position and the character arrangement pattern in the second position closer to the lower-left of the virtual space than the first position in the user arrangement pattern include shared route parts arranged in the same positions, these shared route parts are considered to constitute the character arrangement pattern in the second position.

For example, when a user arrangement pattern including ten route parts as shown in FIG. 12 and FIG. 13 is created by the user, character candidates are detected from the ten route parts through pattern matching. For example, a group of six route parts surrounded by the dotted line in FIG. 12 match with a pre-defined character arrangement pattern corresponding to the character "n". Therefore, the character "n" is detected as a character candidate. Further, a group of four route parts surrounded by the dotted line in FIG. 13 match with a pre-defined character arrangement pattern corresponding to the character "J". Therefore, the character "J" is detected as a character candidate. Here, three route parts at (2, 2), (3, 2), and (4, 2) are included in both "n" in FIG. 12 and "J" in FIG. 13. Therefore, the character arrangement pattern corresponding to "n" and the character arrangement pattern corresponding to "J" both share three route parts. The position of the character arrangement pattern corresponding to "J" in FIG. 13 in the virtual space is on the left side of the position of the character arrangement pattern corresponding to "n" in FIG. 12 in the virtual space. Therefore, character recognition is performed in such a manner that the three route parts at (2, 2), (3, 2), and (4, 2) are considered as to constitute the character arrangement pattern corresponding to "J". That is, the character recognition is performed preferentially from the left side of the virtual space. Then, the character recognition is further performed excluding the character arrangement pattern having been preferentially recognized. In the example of FIG. 13, the character recognition is further performed with respect to six route parts on the right side, which are the route parts out of the ten route parts constituting the user arrangement pattern excluding the preferentially recognized four route parts constituting the character arrangement pattern for "J". As a result, the six route parts are recognized as a character arrangement pattern corresponding to "O". The same applies to a case where there is another character arrangement pattern on the further right side.

Note that the position of the character arrangement pattern constituted of a plurality of the route parts in the virtual space may be defined by a position of any of the plurality of the route parts constituting the character arrangement pattern. For example, of a plurality of the route parts constituting a character arrangement pattern, the position of the lower left route part may be defined as the position of the character arrangement pattern in the virtual space.

Further, in this exemplary embodiment, the character recognition is performed preferentially from the lower left of the virtual space. However, in another exemplary embodiment, the character recognition may be preferentially performed from the right side or the upper side of the virtual space. In other words, the character recognition may be performed preferentially from a plurality of the route parts arranged in a position close to any reference position in the virtual space.

Figure 14:
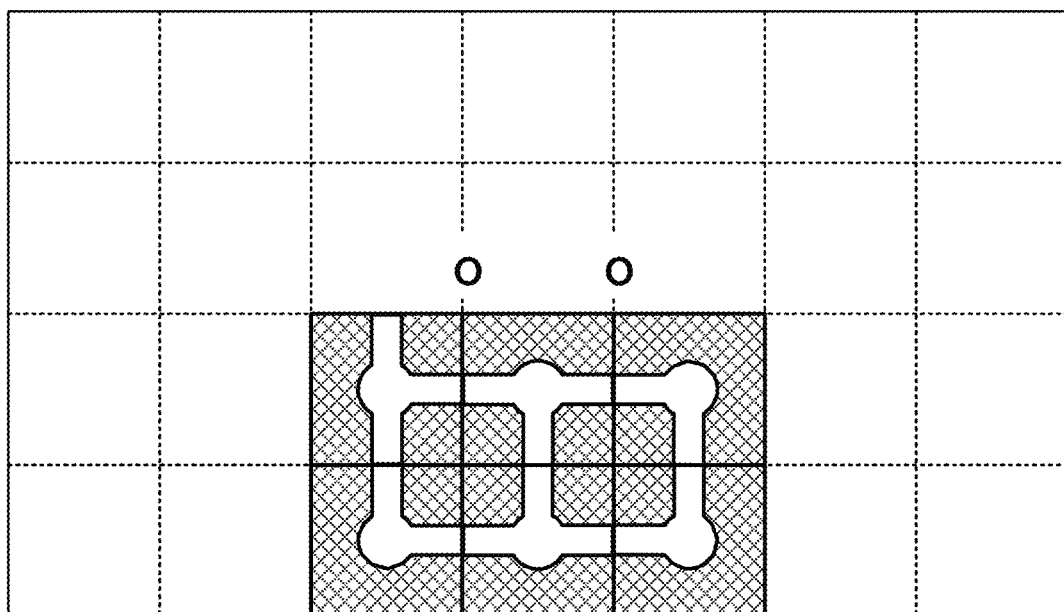
FIG. 14 is an example non-limiting diagram showing an example where a route part partially constitutes two character arrangement patterns.

Note that the route parts arranged in the virtual space basically do not constitute a plurality of character arrangement patterns at the same time. However, in some exceptional cases, a route part arranged in a certain position may partially constitute two character arrangement patterns. FIG. 14 shows an example where a route part partially constitutes two character arrangement patterns. As shown in FIG. 14, four route parts at (3, 3), (4, 3), (3, 4), and (4, 4) constitute a character arrangement pattern corresponding to the "o" characters. Further, four route parts at (3, 4), (4, 4), (3, 5), and (4, 5) constitutes a character arrangement pattern corresponding to "o". These two character arrangement patterns both include the route parts at (3, 4) and (4, 4). Although these route parts (3, 4) and (4, 4) are basically recognized as route parts constituting either one of the character arrangement patterns, these route parts are recognized as two "o"s in a special arrangement pattern such as the one shown in FIG. 14.

Next, the connection count preferential recognition processing is described below. For example, when a route formed by a plurality of the route parts can form a first character as well as a second character, the connection count preferential recognition processing is performed to preferentially recognize the character with a larger connection count. FIG. 15 is a diagram for explaining an overview of the connection count preferential recognition processing.

Seven route parts at (2, 1), (2, 2), (2, 3), (3, 1), (3, 2), (3, 3), and (4, 1) shown in the upper part of FIG. 15 may be regarded as a route part group including five route parts, excluding two route parts arranged at (2, 3) and (3, 3). This route part group constituted of the five route parts, excluding the ones at (2, 3) and (3, 3) looks like the character "F" as shown on the lower left side of FIG. 15. In fact, there is such a character arrangement pattern pre-defined as a character arrangement pattern corresponding to the character "F". Meanwhile, the seven route parts including the ones at (2, 3) and (3, 3) are pre-defined as a character arrangement pattern corresponding to the character "P". That is, the seven route parts shown in the upper part of FIG. 15 are a specific character arrangement pattern corresponding to a single character, which can be the character "P" as well as the character "F".

As described, when a specific arrangement pattern corresponding to a single character can form a plurality of characters, that specific character arrangement pattern is recognized as a character arrangement pattern corresponding to a character with the largest total connection count. Specifically, the total connection count of the character arrangement pattern corresponding to "F" constituted of the five route parts shown in the lower part of FIG. 15 is "10". That is, as the character arrangement pattern corresponding to "F", a pattern as shown on the lower left of FIG. 15 is pre-defined. All the connection counts of the route parts constituting the character arrangement pattern corresponding to "F" sum up to "10". Further, the total connection count of the character arrangement pattern corresponding to "P" constituted of the seven route parts shown in FIG. 15 is "14". Thus, the specific character arrangement pattern shown in the upper part of FIG. 15, which corresponds to a single character, which can be both "F" and "P", is recognized as a character arrangement pattern corresponding to "P" with the larger total connection count. Note that, in this exemplary embodiment, when such a specific character arrangement pattern is detected, the total connection count of the pre-defined character arrangement pattern is calculated for each character in the specific character arrangement pattern. Then, the total connection count of each character is compared to recognize the specific arrangement pattern as either one of the characters. In another exemplary embodiment, when such a specific character arrangement pattern is detected, the total connection count of the plurality of the route parts actually arranged is calculated for each character in the specific character arrangement pattern.

This connection count preferential recognition processing may be said as to be a process of recognizing a character with the longest total length of route images on the route parts, when a plurality of the route parts corresponding to a single character also constitute a different character. For example, where the length of a route image of the "1-directional part (half-penetrating straight line design)" is "1", the total length of the route images in the character arrangement pattern corresponding to "F" shown in the lower left of FIG. 15 is "10". Meanwhile, the total length of the route images of the character arrangement pattern corresponding to "P" shown in the lower right of FIG. 15 is "14". Therefore, the specific character arrangement pattern shown in the upper part of FIG. 15 is recognized as the character arrangement pattern corresponding to "P" whose total length of the route is longer.

As described, in this exemplary embodiment, when a plurality of the route parts arranged in certain positions are included in the route parts constituting a plurality of character arrangement patterns, the connection count preferential recognition processing is performed to preferentially detect the character arrangement pattern with the largest connection count (the longest total length of route images). Specifically, in this exemplary embodiment, where a plurality of the route parts in a user arrangement pattern constitutes a specific character arrangement pattern corresponding to a single character and this specific character arrangement pattern could form the first character and the second character, the specific character arrangement pattern is recognized as the character arrangement pattern corresponding to the second character with the larger connection count (with the longer route). That is, when the character arrangement pattern corresponding to the first character and the character arrangement pattern corresponding to the second character in the user arrangement pattern include a shared route part arranged in a single position, the shared route part is considered to be a route part constituting the character arrangement pattern corresponding to the second character.

As the result of the above-described processings, if a plurality of character arrangement patterns are detected from a user arrangement pattern created by the user, a text string is formed based on the position of each character arrangement pattern in the virtual space. Specifically, the characters corresponding to the character arrangement patterns are aligned from the left to form a text string. This alignment starts from the character corresponding to the character arrangement pattern closer to the lower-left position of (4, 1) in the virtual space. For example, in the user arrangement pattern shown in FIG. 6, the character arrangement patterns include, sequentially from the left side to the right, the character arrangement pattern corresponding to "e", the character arrangement pattern corresponding to "b", and the character arrangement pattern corresponding to "C". Aligning these characters from the left forms a text string "ebC". Further, in the user arrangement pattern shown in FIG. 13, a text string "JO" is formed. Then, whether the text string thus formed matches with a pre-defined forbidden word is determined. If the text string formed matches with a pre-defined forbidden word, uploading of the arrangement information representing the user arrangement pattern is prohibited.

(Restriction of Uploading Forbidden Symbol)

Next, restriction of uploading a forbidden symbol is described. In this exemplary embodiment, a plurality of specific symbol patterns corresponding to forbidden symbols are pre-defined. The "specific symbol pattern" herein is an arrangement pattern of a plurality of the route parts such that the route (design) formed by the arrangement of the route parts looks like a forbidden symbol (an example of a specific design). The specific symbol pattern includes the arrangement positions, the designs, and the arrangement directions of the plurality of the route parts as its element.

If the user arrangement pattern created by the user includes a specific symbol pattern, uploading of arrangement information representing such a user arrangement pattern is prohibited.

Note that an exception area is provided for each specific symbol pattern as in the case of the character arrangement pattern. Therefore, an arrangement pattern having its route extending into the exception area is not considered as the specific symbol pattern. In other words, when the route extends from a route part forming a specific symbol pattern to an exception area set for that specific symbol pattern (when a route part in the exception area connects with a route part which is adjacent to the exception area and which forms the specific symbol pattern), the route parts are not recognized as the specific symbol pattern.

Further, in this exemplary embodiment, whether the specific symbol pattern is a forbidden symbol pattern is determined for each partial collective design formed by a plurality of the route parts (a plurality of the route parts of a single type) corresponding to a single design type (display form of the route image). That is, in a case where a main route part group including a plurality of the main route parts matches with a pre-defined specific symbol pattern, a forbidden symbol corresponding to that specific symbol pattern is detected. Further, in a case where a sub route part group including a plurality of the sub route parts matches with a pre-defined specific symbol pattern, a forbidden symbol corresponding to that specific symbol pattern is detected. In other words, in this exemplary embodiment, a plurality of the route parts including a mix of the main route parts and the sub route parts are not recognized as to form a single forbidden symbol.

<Details of Processing>

Next, processing taking place in the game system 1 is detailed. First, the following describes data stored in the game system 1 while the processing is executed according to later-described flowcharts. FIG. 16 is a diagram showing exemplary data stored in the game system 1.

As shown in FIG. 16, the game system 1 (specifically, DRAM 85, flash memory 84, or an external storage medium attached to the slot 23) stores a game program, route part data, user arrangement pattern data, character arrangement pattern data, forbidden symbol pattern data, and forbidden word data. In addition to these sets of data, various data for use in the game (e.g., data related to player object PO) is stored.

The game program is a program for executing a game to take place in the game system 1, and executes the processing according to the later-described flowcharts.

The route part data is data related to a plurality of the route parts prepared in advance. The route part data includes data related to the main route parts and data related to the sub route parts. Each of the route parts has the route image (design) to form a route along which the player object PO is able to move.

The user arrangement pattern data is a set of data generated by the arrangement operation by the user, and contains information related to the arrangement position, the design, and the arrangement direction of each route part arranged in the virtual space. The information related to the arrangement position of the route part is expressed as (n, m), for example. The information related to the design of the route part indicates a design type of the route part, and indicates any one of the following design types: no-design, half-penetrating straight line design, I-shaped design, L-shaped design, T-shaped design, and curved design. Information related to the arrangement direction of the route part indicates the rotation angle, and for example, indicates 0 degrees, 90 degrees, 180 degrees, or 270 degrees. Further, the user arrangement pattern data contains information indicating the type of each route part (the main route part or the sub route part).

The character arrangement pattern data is data used for character determination, and indicates a pre-defined arrangement pattern in which a route formed by a plurality of the route images looks like a single character. The character arrangement pattern data is data containing information related to the relative positions, designs, and arrangement directions of a plurality of the route parts. For each character, a set of character arrangement pattern data is prepared. Each character arrangement pattern includes an exception area. In this exemplary embodiment, there are sets of character arrangement pattern data prepared in advance, which correspond to a plurality of alphabetic characters and Arabic numeric symbols.

The forbidden symbol pattern data is data indicating a pre-defined arrangement pattern in which a route formed by the route images on a plurality of the route parts looks like a forbidden symbol. The forbidden symbol pattern data is data containing information related to the relative positions, designs, and arrangement directions of a plurality of the route parts. In this exemplary embodiment, there are a plurality of sets of forbidden symbol pattern data corresponding to a plurality of forbidden symbols. Further, each forbidden symbol pattern includes an exception area.

The forbidden word data is data indicating words which are restricted from being published. In this exemplary embodiment, a plurality of forbidden words are pre-defined.

Figure 17:
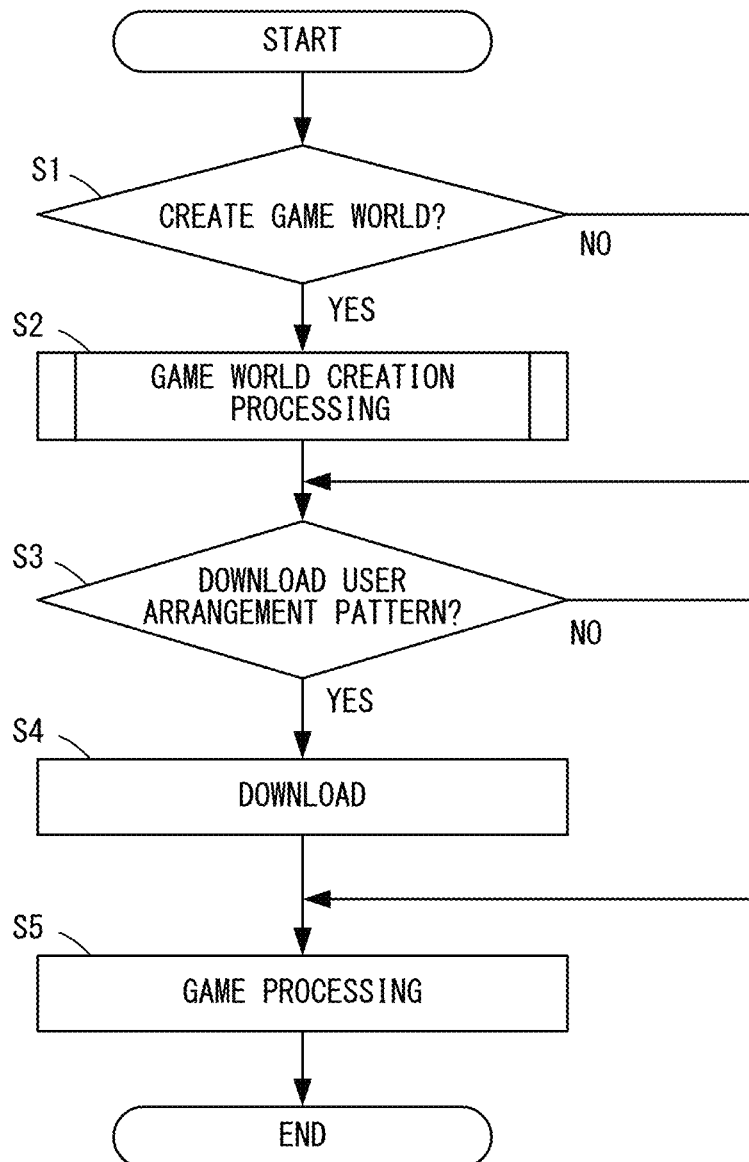
FIG. 17 is an example non-limiting flowchart showing exemplary processing executed by a processor 81 of the game system 1.

FIG. 17 is a flowchart showing exemplary processing executed by the processor 81 of the game system 1. For example, the processing shown in FIG. 17 is started in response to an instruction of starting a game by the user.

As shown in FIG. 17, the processor 81 determines whether a game world is to be created/edited (step S1). Specifically, the processor 81 determines whether the user has instructed creation/editing of a game world.

If the user has instructed creation/editing of a game world (step S1: YES), then the processor 81 displays a game world creation screen as shown in FIG. 4, and executes game world creation processing (step S2). In the game world creation processing, the route parts are arranged in the virtual space according to the arrangement operation by the user, thereby creating a game world. Then, if uploading of the created game world to the server is instructed, determinations related to the above-described forbidden words and forbidden symbols are performed to determine whether to enable or prohibit the upload. The game world creation processing of step S2 is detailed later.

When step S2 is executed, or when the step S1 results in NO, the processor 81 determines whether to download user arrangement pattern data (arrangement information) which is created and uploaded to the server by another user (step S3). Specifically, when downloading of the user arrangement pattern data uploaded to the server is instructed by the user, the processor 81 determines YES in step S3. When it is determined that the user arrangement pattern data of another user is to be downloaded (step S3: YES), the processor 81 downloads the user arrangement pattern data of the other user from the server (step S4).

When step S4 is executed, or when step S3 results in NO, the processor 81 performs the game processing (step S5). In step S5, the game processing is performed based on the downloaded user arrangement pattern data created by the other user, or the user arrangement pattern data created by the user of the game system 1. Specifically, in step S5, a game world with a route in its virtual space is created based on the user arrangement pattern data and a player object PO is arranged. The player object PO is moved along the route according to an operation by the user. When the player object PO reaches a course point set on the route, the screen transits to a game stage set for that course point, and a game using the player object PO is performed. When the player object PO reaches the goal point set on the route of the game world, or when termination of the game is instructed by the user, the processor 81 terminates the game processing of step S5. This is the end of the description of FIG. 17.

(Details of Game World Creation Processing)

Figure 18:
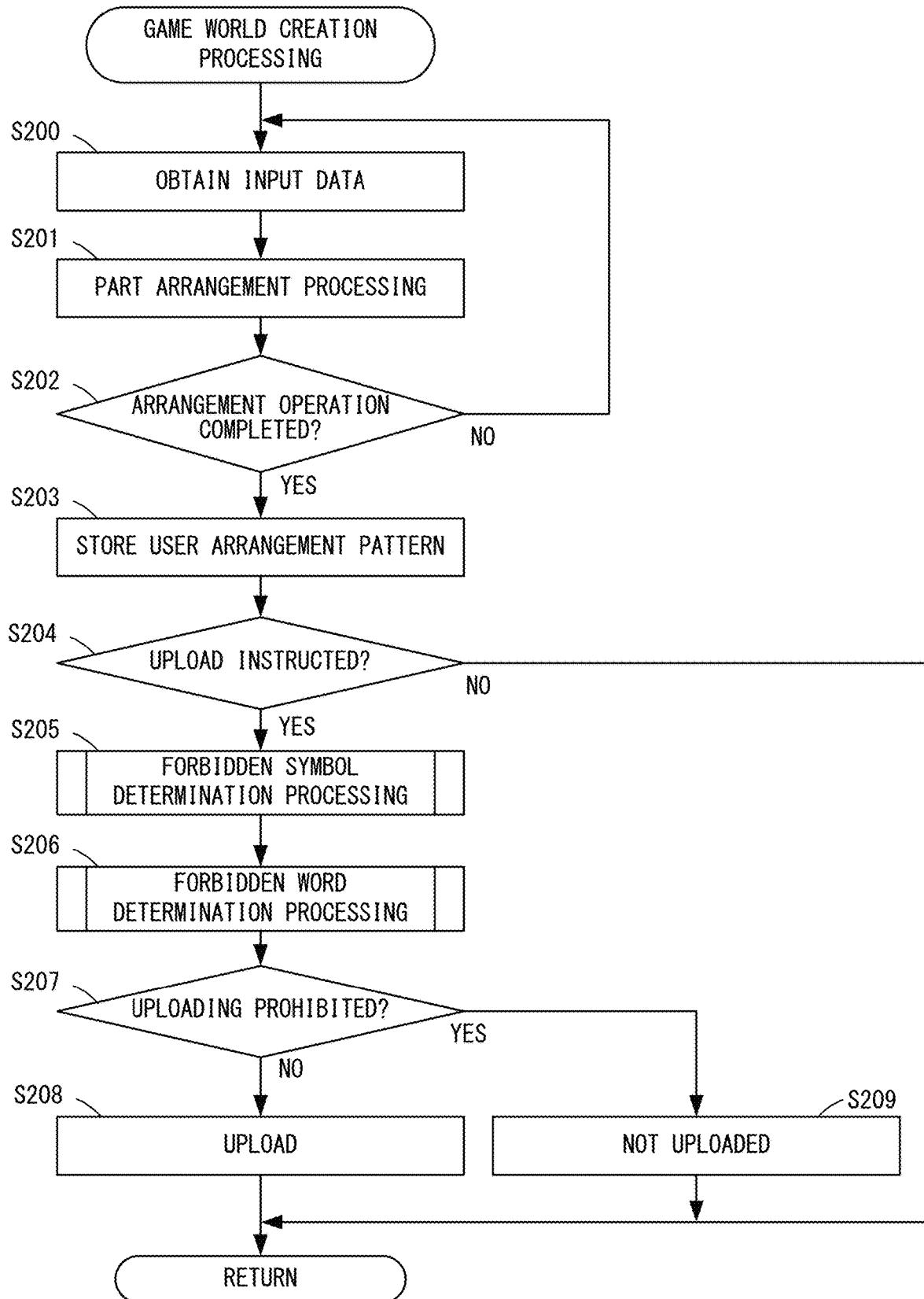
FIG. 18 is an example non-limiting flowchart showing exemplary game world creation processing of step S2.

Next, the game world creation processing of step S2 is detailed. FIG. 18 is a flowchart showing exemplary game world creation processing of step S2.

As shown in FIG. 18, the processor 81 obtains input data according to an input to an input device (the left controller 3, the right controller 4, the touch panel 13, or the like) (step S200). Next, the processor 81 performs part arrangement processing based on the input data obtained (step S201). Here, in the game world creation screen as illustrated in FIG. 4, the route parts are selected and arranged in the cells of the grid in the virtual space, according to the arrangement operation by the user. Specifically, in the game world creation screen shown in FIG. 4, any one of a plurality of the route parts is selected by the user. Then, the route part selected is arranged at a position of the virtual space, designated by the user. Further, when the user performs a rotating operation of the route part (for example, a tap operation on the route part arranged), the route part is rotated. This changes the direction of the design (route image) on the route part. Information related to the arrangement position, the design, and the arrangement direction of each route part is stored as the user arrangement pattern data.

Next, the processor 81 determines whether the user has completed the arrangement operation (step S202). Specifically, the processor 81 determines the arrangement operation is completed, when the user instructs completion of the arrangement operation. When step S202 results in NO, the processor 81 repeats the processing from step S200. By repeating step S200 to step S202 at predetermined frame time intervals (e.g., at 1/60 second intervals), a plurality of the route parts are arranged in the virtual space according to the arrangement operation by the user, thus forming a route. That is, user arrangement pattern data containing the arrangement positions, the designs, and the rotational directions of the plurality of the route parts as elements is created.

When the step S202 results in YES, the processor 81 stores the user arrangement pattern data created in, for example, a flash memory 84 (step S203).

Next, the processor 81 determines whether the user has instructed uploading of the user arrangement pattern data created to the server (step S204). When the uploading is instructed by the user (step S204: YES), the processor 81 executes forbidden symbol determination processing (step S205). The forbidden symbol determination processing is processing for determining whether the user arrangement pattern created by the user is a specific pattern including a forbidden symbol. This forbidden symbol determination processing of step S205 is detailed later.

Next, the processor 81 executes forbidden word determination processing (step S206). The forbidden word determination processing is processing for determining whether the user arrangement pattern created by the user is a specific pattern including a forbidden word. This forbidden word determination processing of step S206 is detailed later.

Next, the processor 81 determines whether uploading of the user arrangement pattern data (arrangement information) is prohibited, based on the result of step S205 and step S206 (step S207). If the uploading is not prohibited (step S207: NO), the processor 81 uploads the user arrangement pattern data to the server (step S208). On the other hand, if the uploading is prohibited (step S207: YES), the processor 81 does not upload the user arrangement pattern data to the server (step S209). Note that, in step S209, the processor 81 may perform display to indicate that uploading of the user arrangement pattern data to the server is prohibited.

The processor 81 terminates the processing of FIG. 18, when step S208 or step S209 is performed, or when the step S204 results in NO.

(Details of Forbidden Symbol Determination Processing)

Figure 19:
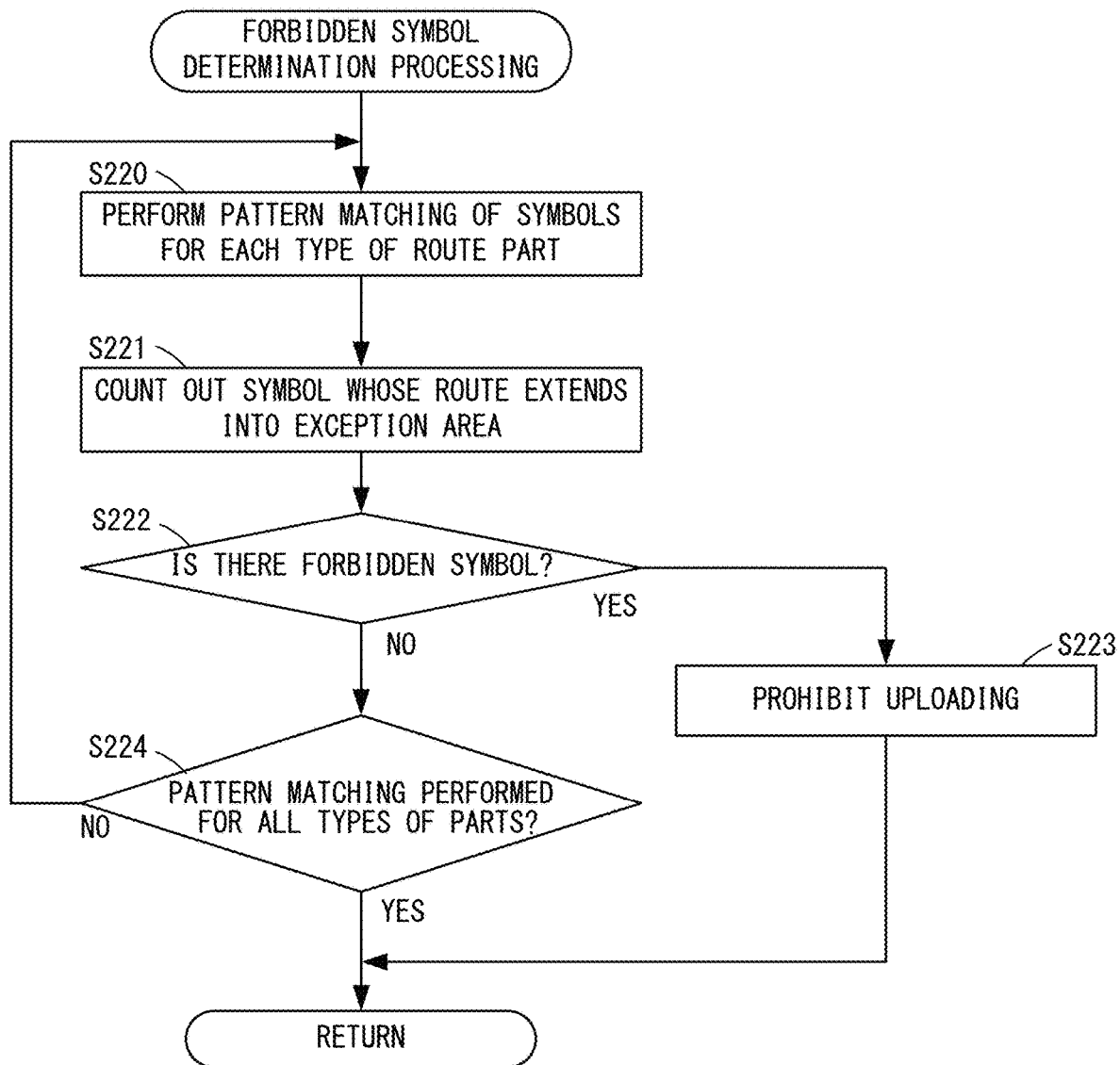
FIG. 19 is an example non-limiting flowchart showing exemplary forbidden symbol determination processing of step S205.

Next, the forbidden symbol determination processing in step S205 is detailed. FIG. 19 is a flowchart showing exemplary forbidden symbol determination processing of step S205.

As shown in FIG. 19, the processor 81 performs the pattern matching of symbols for each type of the route parts, based on the user arrangement pattern data (step S220). The types of the route parts are the design types of the route parts and the display forms of the designs. Specifically, the processor 81 selects a type of a plurality of the route parts (the main route parts each having the route image of a solid line or the sub route parts each having the route image of a dotted line), and determines whether a route part group constituted of a plurality of the selected type of route parts contains a pre-defined forbidden symbol pattern indicating a forbidden symbol. For example, the processor 81 extracts only the main route parts from the user arrangement pattern, and determines whether the arrangement positions, the designs (half-penetrating straight line design, I-shaped design, and the like), and the arrangement directions of the plurality of the main route parts match with any forbidden symbol pattern indicating a forbidden symbol. This way, the processor 81 detects, as a forbidden symbol candidate, an arrangement pattern matching with a pre-defined forbidden symbol from the route part group constituted of a plurality of the main route parts arranged by the user.

Next, when a forbidden symbol candidate is detected in step S220, the processor 81 excludes the forbidden symbol candidate if the route of the detected forbidden symbol candidate extends into an exception area set for the forbidden symbol (step S221). As described hereinabove, the forbidden symbol pattern has a pre-defined exception area. If the route extends into the exception area, that is, if a route part forming the forbidden symbol connects to a route part arranged in the exception area, the processor 81 counts out the forbidden symbol candidate.

Then, the processor 81 determines whether a forbidden symbol exists in the user arrangement pattern (step S222). As a result of step S221, if the user arrangement pattern contains one or more forbidden symbols (step S222: YES), the processor 81 prohibits uploading of the user arrangement pattern (step S223). The processor 81 then terminates the processing shown in FIG. 19.

On the other hand, if the user arrangement pattern does not contain a forbidden symbol (step S222: NO), then the processor 81 determines whether the pattern matching has been performed for all types of the route parts (step S224). Here, the processor 81 determines whether step S220 to step S222 have been performed for both the main route parts and the sub route parts.

When the step S224 results in NO, the processor 81 executes S220 again to select a type of the route parts different from the type described above, and perform the same processing. When the step S224 results in YES, the processor 81 terminates the processing shown in FIG. 19.

(Details of Forbidden Word Determination Processing)

Next, the forbidden word determination processing in step S206 is detailed. FIG. 20 is a flowchart showing exemplary forbidden word determination processing of step S206.

As shown in FIG. 20, the processor 81 performs the pattern matching of characters for each type of the route parts, based on the user arrangement pattern data created by the user (step S230). The types of the route parts are the design types of the route parts and the display forms of the designs. Specifically, the processor 81 selects a type of a plurality of the route parts (the main route parts each having the route image of a solid line or the sub route parts each having the route image of a dotted line), and determines whether a route part group including a plurality of the selected type of route parts contains a pre-defined character arrangement pattern. For example, the processor 81 extracts only the main route parts from the user arrangement pattern, and determines whether the arrangement positions, the designs (half-penetrating straight line design, I-shaped design, and the like), and the arrangement directions of the plurality of the main route parts match with a pre-defined character arrangement patterns. This way, the processor 81 detects, as a character candidate, an arrangement pattern matching with a pre-defined character arrangement pattern from the plurality of the main route parts arranged by the user. Here, all the character candidates are detected. For example, in a case of the user arrangement pattern shown in FIG. 15, seven main route parts are detected as the character arrangement pattern corresponding to "F" as well as the character arrangement pattern corresponding to "P". Further, in a case of the user arrangement patterns shown in FIG. 12 and FIG. 13, the character arrangement pattern corresponding to "n", the character arrangement pattern corresponding to "I", the character arrangement pattern corresponding to "J", and the character arrangement pattern corresponding to "O" are detected.

Next, in regard to the character candidate detected in S230, the processor 81 excludes the character candidate if a route of the detected character candidate extends into the exception area set for the character arrangement pattern (step S231). As described hereinabove, the character arrangement pattern has a pre-defined exception area. If the route extends into the exception area, that is, if a route part forming the character connects to a route part arranged in the exception area, the processor 81 counts out that character candidate.

Next, the processor 81 determines if there are characters using the same route part (step S232). Here, the processor 81 determines whether any route part is shared between character candidates detected in step S230. For example, in a case of the user arrangement pattern shown in the upper part of FIG. 15, the characters of "F" and "P" are detected as the character candidates in step S230. These two character candidates include five shared route parts (i.e., route parts at (2, 1), (2, 2), (3, 1), (3, 2), and (4, 1)). In this case, step S232 results in YES. Further, for example, in a case of the user arrangement pattern shown in FIG. 12, four character candidates are detected in step S230. That is, from the user arrangement pattern shown in FIG. 12, the characters "n", "I", "J", and "O" are detected as the character candidates (FIG. 12, FIG. 13). The two character candidates of "n" and "J" include three shared route parts (i.e., the route parts at (2, 2), (3, 2), and (4, 2)). In this case, step S232 results in YES.

When the step S232 results in YES, the processor 81 performs the left-preferential recognition processing which preferentially recognizes a character on the left side (step S233). Here, characters are recognized preferentially from the lower left of the screen. Specifically, for all the plurality of character candidates detected in step S230, except for the character candidates excluded in step S231, the processor 81 specifies the positions of the character arrangement patterns constituting the corresponding characters. Then, based on the positions of the character arrangement patterns specified, the processor 81 recognizes characters sequentially from the lower left to the upper right of the virtual space. For example, in a case of the user arrangement pattern shown in FIG. 13, the processor 81 first recognizes the character "J", and then recognizes another character from the plurality of the route parts excluding the parts forming "J". As a result, the processor 81 recognizes "J" and "O" in the user arrangement pattern shown in FIG. 13.

Next, the processor 81 performs the connection count preferential recognition processing which preferentially recognizes a character with a larger total connection count (step S234). Specifically, when there is a specific character arrangement pattern detected as a plurality of character candidates, the processor 81 calculates the total connection count of each of the character candidates. Then, the processor 81 recognizes the specific character arrangement pattern as the character with a larger total connection count. For example, the processor 81 recognizes the user arrangement pattern shown in the upper part of FIG. 15 as the character "P" having a larger total connection count.

If step S234 is performed, or if the step S232 results in NO, the processor 81 determines whether the pattern matching is performed for the route parts of all the types (step S235). Here, the processor 81 determines whether step S230 to step S234 have been performed for both the main route parts and the sub route parts.

When the step S235 results in NO, the processor 81 executes S230 again to select a type of the route parts different from the type described above, and perform the same processing.

On the other hand, when the step S235 results in YES, the processor 81 forms a text string (word) with the characters recognized in the processings from step S230 to step S235 (step S236). Here, the processor 81 aligns the recognized characters, based on the positions of the character arrangement patterns corresponding to the characters in the virtual space, thus forming a text string. In this case, the characters are aligned sequentially from the character arrangement pattern appearing on the left side of the virtual space.

Next, the processor 81 determines whether the text string formed in step S236 contains a pre-defined forbidden word (step S237). If the text string contains a forbidden word (step S237: YES), the processor 81 prohibits uploading of the user arrangement pattern (step S238).

The processor 81 terminates the processing of FIG. 20, when step S237 results in NO, or when step S238 is executed.

As described, when the uploading is prohibited in step S223 or step S238, the user arrangement pattern data is not uploaded in step S209. If neither step S223 nor step S238 is performed, uploading of the user arrangement pattern data is permitted, and the user arrangement pattern data is uploaded in step S208.

Note that the processing of the above-described flowcharts is each no more than an example, and the sequence, the contents, and the like of the processings may be suitably modified.

As described hereinabove, an information processing system of this exemplary embodiment includes a server and a game system 1. The game system 1 arranges route parts each having a design (route image) to be displayed on a display device, in a virtual space according to the arrangement operation by a user (step S201). The game system 1 determines whether a user arrangement pattern (which contains, as its element, the arrangement positions and the designs of a plurality of the route parts arranged in the virtual space according to the arrangement operation by the user) is a specific pattern containing a specific design (forbidden symbol, forbidden word) within a collective design formed by the designs of a plurality of the route parts (step S205, step 206). The game system 1 uploads arrangement information representing the user arrangement pattern to the server if the user arrangement pattern is not determined as the specific pattern (step S208), and does not upload the arrangement information to the server if the user arrangement pattern is determined as the specific pattern (step S209).

As described, the user can form a collective design (route) in the virtual space by arranging, in the virtual space, the route parts each associated with a design, according to the arrangement operation by the user. If the collective design formed by the user contains a specific design, uploading of the collective design created by the user to the server is prohibited. Therefore, it is possible to keep another user from accessing the specific design (e.g., keep the other user from browsing a specific form or playing a game using the specific form).

Further, this exemplary embodiment allows the user to rotate each route part and arrange the route part in the virtual space. Therefore, the user is able to change the direction of each route part (orientation of the design) displayed on the display device, and freely draw a design. In a case where the user is able to freely draw a design, as in the above case, the collective design created by the user may contain the specific design. However, even if such a specific design is created by the user, the collective design containing the specific design is prohibited from being uploaded. Therefore, it is possible to keep another user from accessing such a specific design.

Further, this exemplary embodiment determines whether the collective design contains a specific symbol or a specific text string, as the specific design (S222, S237). Therefore, it is possible to restrict uploading of a specific symbol or a specific text string.

Further, in this exemplary embodiment, a forbidden symbol pattern and a character arrangement pattern are each provided with an exception area. If the exception area contains a predetermined design (a design connecting to a route part forming the specific symbol or the specific character), the forbidden symbol pattern and the character arrangement pattern are considered as not including the specific symbol or the specific character (S221, S231). As a result, a design which hardly looks like the specific symbol or the specific character as a whole is kept from being recognized as the specific symbol or the specific character.

Further, in this exemplary embodiment, if there is a specific character arrangement pattern corresponding to a single character, which can form a first character as well as a second character, that specific character arrangement pattern is recognized as the second character having a larger connection count (S234). In other words, the specific character arrangement pattern is recognized as the second character having a longer route. This way, a group of route parts which can form the first character as well as the second character can be recognized as the second character. A route with a larger connection count is more easily recognized by the user as compared to a route with a smaller connection count. Therefore, the game system can recognize a character which is more easily recognizable as a character by the user, and uploading of a specific text string easily recognizable by the user is restricted.

Further, in this exemplary embodiment, if a route part in the user arrangement pattern can form a character arrangement pattern arranged in a first position as well as a character arrangement pattern arranged in a second position closer to a reference position (lower left position) of the virtual space as compared to the first position, that route part is preferentially considered as to form the character arrangement pattern in the second position (S233). This allows, for example, preferential recognition of the character arrangement pattern positioned on the left side. Therefore, the game system can detect a text string easily recognizable by the user.

Further, in this exemplary embodiment, recognition of a symbol or a character is performed for each design type (the route image of a solid line or the route image of a dotted line) (S220, S230). That is, recognition of a symbol or a character is performed for each type of the route part. This enables recognition of a symbol or a character for each collection of the route parts which is easily recognizable as a group by the user.

Further, in this exemplary embodiment, a route is formed by aligning a plurality of quadrangular route parts in the virtual space. The user is able to move a player object on the route formed, and play a game using the route created by him/herself.

Further, in this exemplary embodiment, the game system performs the above-described determination at a time of uploading data from the game system to the server, and prohibits uploading of data depending on the result of the determination. This reduces the processing load of the server.

(Modification)

An exemplary embodiment is thus described hereinabove. It should be noted that the above description is no more than an example, and various modifications as described below are possible.

For example, in the above exemplary embodiment, an alphabetic character is detected from the user arrangement pattern created by the user, and whether a text string formed by a plurality of alphabetic characters is a forbidden word is determined. In another exemplary embodiment, any character including not only an alphabetic character but also other types of characters (e.g., Greek alphabet, Arabic alphabet, Korean alphabet, Chinese characters, Japanese Kana characters, and the like) may be detected, and whether a text string formed by these characters is a forbidden word may be determined.

Further, in the above-described exemplary embodiment, whether the user arrangement pattern created by the user is a specific pattern containing a forbidden word (forbidden text string) is determined. If a forbidden word is contained, that user arrangement pattern is prohibited from being published. In another exemplary embodiment, whether the user arrangement pattern created by the user is a specific pattern containing a single forbidden character may be determined. If a forbidden character is contained, that user arrangement pattern may be prohibited from being published. Note that the single forbidden character may be detected as a forbidden symbol and publishing of the same may be prohibited.

Further, in the above-described exemplary embodiment, if the user arrangement pattern is a specific pattern containing a specific design, then the game system 1 prohibits uploading of arrangement information representing that user arrangement pattern to the server. In other words, restriction of publishing the arrangement information takes place on the game system 1 side. In another exemplary embodiment, it may be the server side which restricts publishing of the arrangement information. For example, the arrangement information representing the user arrangement pattern may be uploaded to the server even if the game system 1 determines that the user arrangement pattern is the specific pattern containing a specific design, and it may be the server which restricts publishing of the arrangement information uploaded. For example, when publishing of the uploaded arrangement information is restricted and another user requests download of that arrangement information, the server may reject that request and not transmit the arrangement information to the other user. On the other hand, when publishing of the uploaded arrangement information is not restricted, the server transmits the arrangement information to the other user in response to the request of downloading the arrangement information from the other user.

Further, in another exemplary embodiment, if a user arrangement pattern created by a first user is not a specific pattern, arrangement information representing that user arrangement pattern may be directly transmitted from the game system of the first user to the game system of a second user, without going through the server. In this case, if the user arrangement pattern created by the first user is a specific pattern, a control may be performed so that the arrangement information is not transmitted from the game system of the first user to the game system of the second user.

Further, in another exemplary embodiment, it may be the server side that performs the processing of determining whether the user arrangement pattern is a specific pattern containing a specific design. For example, when the game system uploads the arrangement information representing the user arrangement pattern to the server, the server determines whether that user arrangement pattern is a specific pattern. Then, the server may reject uploading of the arrangement information from the game system if the user arrangement pattern is determined as to be the specific pattern. Alternatively, if the user arrangement pattern is determined as to be a specific pattern, the server may perform a control so as to accept and store the arrangement information uploaded in the storage device thereof, but disable access to the arrangement information by another user.

Further, in the above-described exemplary embodiment, there are a plurality of the route parts respectively associated with a plurality of designs having different shapes (1-directional part, 2-directional I-shaped part, 2-directional L-shaped part, 3-directional part, curved part, and the like), and the user arrangement pattern created by the user contains information related to the designs (half-penetrating straight line design, I-shaped design, L-shaped design, and the like) associated with these route parts. In another exemplary embodiment, the route parts prepared may only have a single shape. For example, only the 2-directional I-shaped parts may be provided. In this case, each of the 2-directional I-shaped parts, when displayed on the display device, becomes a design of a lateral direction or a design of a longitudinal direction depending on its rotation angle. That is, even though the shape of the design per se is one type, the 2-directional I-shaped part can be used as a "route part associated with a design of a lateral direction" or a "route part associated with a design of a longitudinal direction" by changing the direction of the 2-directional I-shaped part. Therefore, formation of various collective designs is possible by arranging the 2-directional I-shaped part in the virtual space according to the arrangement operation by the user. Then, whether a user arrangement pattern (which contains, as its elements, arrangement positions and designs of the plurality of the route parts arranged in the virtual space according to the arrangement operation by the user) is a specific pattern containing a specific design may be determined. Here, the "designs associated with the plurality of the route parts" means designs to be displayed on the display device, and specifically includes two types: a design of a lateral direction which is formed by the 2-directional I-shaped part without rotation, and a design of a longitudinal direction formed by the 2-directional I-shaped part rotated by 90 degrees.

Further, in the above-described exemplary embodiment, if the user arrangement pattern created by the user is not a specific pattern, the user arrangement pattern is uploaded from the game system to the server so as to enable access of another user to the user arrangement pattern, and if the user arrangement pattern is a specific pattern, uploading of the user arrangement pattern from the game system to the server is prohibited so as to restrict access by another user to the user arrangement pattern. In another exemplary embodiment, access by another user may be restricted in another way. For example, if the user arrangement pattern created by the user is a specific pattern, information (prohibition flag, lock key, and the like) to restrict another user from accessing the user arrangement pattern may be embedded to the user arrangement pattern. Such information to restrict access by another user may be embedded by the game system 1 or by the server. Even if another user retrieves the arrangement information with the information to restrict the access embedded, execution of a game using that arrangement information is restricted. Publishing of a route created by the user containing a specific design (e.g., forbidden symbol or forbidden word) to another player may be restricted in this way.

Further, a method other than the one described above may be adopted as a method of restricting the second user from accessing the user arrangement pattern created by the first user. For example, if the user arrangement pattern created by the first user is a specific pattern, the user arrangement pattern is uploaded to the server and downloaded to the game system 1 of the second user upon request. The game system 1 of the second user may be controlled so that a game world containing the route formed based on the user arrangement pattern created by the first user is displayed but in a reduced size (thumbnail display), and a game using that route is disabled. Alternatively, when the second user executes a game based on the user arrangement pattern created by the first user, a portion of the specific pattern (forbidden symbol or forbidden word) in the user arrangement pattern created by the first user is blackened or blurred so that the second user is not able to see or has a difficulty in seeing the portion of the specific pattern. This method may be adopted to restrict access by the second user to the user arrangement pattern created by the first user. If, on the other hand, the user arrangement pattern created by the first user is not a specific pattern, such a restriction (reduced display, disabling the game, blackening or blurring, and the like) is not implemented, and the second user is able to see the entire route created by the first user and play a game using the entire route.

Further, in the above-described exemplary embodiment, the forbidden symbol pattern and the character arrangement pattern each has an exception area. If the route of the forbidden symbol pattern or the character arrangement pattern extends from a route part forming the corresponding forbidden symbol or character into the exception area, that forbidden symbol pattern or the character arrangement pattern is not recognized as the corresponding forbidden symbol or character. In another exemplary embodiment, the forbidden symbol pattern or the character arrangement pattern may not be recognized as the corresponding forbidden symbol or character, even if the route does not extend to the exception area, that is, even if a route part arranged in a forbidden area does not connect to a route part forming the corresponding forbidden symbol or character, provided that the route part arranged in the forbidden area has a predetermined design.

Further, the above-described exemplary embodiment assumes that uploading of arrangement information from the game system to the server publishes the arrangement information to unspecified users. In another exemplary embodiment, the arrangement information uploaded to the server may be downloadable by a specific other user authorized.

Further, in yet another exemplary embodiment, the above-described access restriction may be applied, even if the system does not assume uploading of the arrangement information to the server. For example, in a single game system shared by a plurality of users, arrangement information representing a user arrangement pattern created by a certain user may be restricted from being accessed by another user, if that user arrangement pattern is a specific pattern. For example, in such a game system, an account is created for each user, and a storage area is provided for each account. For example, a first user arrangement pattern created by a first user is stored in a first storage area associated with the first user. If the first user arrangement pattern is not a specific pattern, a second user having logged in the game system is able to play a game based on the first user arrangement pattern stored in the first storage area. If the first user arrangement pattern is a specific pattern, the second user is not able to play a game based on the first user arrangement pattern stored in the first storage area, even if the second user has logged in the game system.

Further, in the above-described exemplary embodiment, recognition of a character or symbol is performed for each design type (e.g., for designs of solid lines or designs of dotted lines). In other words, a plurality of the route parts associated with different design types (display forms) are considered as not to form a single character or symbol. In another exemplary embodiment, even if a group of route parts includes different types of designs, that group of route parts may be considered as to constitute a single character or symbol.

Further, in yet another exemplary embodiment, a plurality of the route parts having different background images may constitute a single character or symbol.

Further, in the above-described exemplary embodiment, the virtual space is divided into a grid of multiple square cells, and a route is formed by arranging the square route parts. In another exemplary embodiment, the virtual space may be divided into cells having a quadrangular shape (e.g., a rectangular shape or a diamond shape), triangular shape, hexagonal shape, and the like, and the shape of each cell is not limited to a square. Further, the virtual space does not have to be divided into these n-gonal shapes. Instead, each route part may have an n-gonal shape, and a route may be formed by arranging the route parts having the n-gonal shape.

Further, in the above-described exemplary embodiment, a plurality of arrangement patterns each representing a symbol or character is pre-defined. By performing the pattern matching with respect to a user arrangement pattern created by a user, whether that user arrangement pattern is a specific pattern containing a specific symbol or character is determined. In another exemplary embodiment, a learned model may be generated for many arrangement patterns including forbidden symbols and forbidden words through machine learning such as deep learning. When a user arrangement pattern created by a user is input to the learned model, the learned model may output information indicating (information indicating the possibility of) that user arrangement pattern being a specific pattern containing a forbidden symbol or forbidden word.

Any combination of the above-described exemplary embodiment and the other exemplary embodiment is possible, provided that such a combination is not contradictory. Further, the above description is no more than an example of the exemplary embodiment, and various improvements and modifications other than the above may be added.

While certain example systems, methods, devices, and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
   at least one processor; and
   at least one memory coupled thereto, the at least one memory storing computer readable instructions that, when executed by the at least one processor, cause the information processing system to at least:
   arrange parts, each of which is associated with one of designs, of a plurality of types, to be displayed on a display device, in a virtual space according to an arrangement operation by a user;
   determine whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts, the specific design being formed when the arranged parts are arranged having images in a predetermined positional relationship connecting the images of adjacent arranged parts to form the specific design, and the arranged parts have predetermined designs corresponding to positions of the arranged parts; and
   allow access by another user to arrangement information representing the user arrangement pattern when the user arrangement pattern is not determined as to be the specific pattern, while restricting access by said another user to the arrangement information when the user arrangement pattern is determined as to be the specific pattern, wherein
   the specific design is at least one of a specific sign, shape, or character, and
   the processor determines the user arrangement pattern is the specific pattern, when a specific symbol pattern corresponding to the at least one of the specific sign, shape or character formed by the designs of the plurality of the parts is detected from the user arrangement pattern.

2. The information processing system according to claim 1, wherein
   the processor is further configured to rotate an arrangement direction of each of the parts in the virtual space, and
   the processor determines whether the user arrangement pattern is the specific pattern, the user arrangement pattern containing, the arrangement position, the design, and the arrangement direction of each of the plurality of the parts.

3. The information processing system according to claim 1, wherein
   each of the parts is associated with at least one of a plurality of design types, and
   the processor determines whether each of one or more partial collective designs is the specific pattern containing the specific design, the each of the one or more partial collective designs formed by the parts associated with the same design type out of the design types.

4. The information processing system according to claim 1, wherein
   each of the parts has a quadrangular shape, and
   the processor aligns and arranges the parts of the quadrangular shape in the virtual space.

5. The information processing system according to claim 1, wherein
   the information processing system comprises a user terminal and a server,
   the processor prohibits uploading of the arrangement information from the user terminal to the server to restrict access by another user to the arrangement information.

6. The information processing system according to claim 5, wherein
   the user terminal determines whether the user arrangement pattern is a specific pattern, and
   when the user terminal does not determine the user arrangement pattern is the specific pattern, the processor uploads the arrangement information from the user terminal to the server.

7. The information processing system according to claim 1, wherein
   the information processing system comprises a user terminal and a server,
   when the user arrangement pattern is determined as to be the specific pattern, the processor restricts access by another user to the arrangement information uploaded from the user terminal to the server.

8. The information processing system according to claim 1, wherein
   the processor is configured to arrange a virtual player character in the virtual space, and
   control a movement of the virtual player character,
   the collective design formed by the user arrangement pattern is a traveling path for the virtual player character, in which the designs of the parts are connected to one another, and
   the processor moves the virtual player character on the collective design.

9. The information processing system according to claim 1, wherein
   the at least one of the specific sign, shape or character is a forbidden sign, shape, or character registered in advance.

10. The information processing system of claim 1, wherein
    the at least one of the specific sign, shape or character is a specific text string formed by a plurality of characters.

11. The information processing system according to claim 1, wherein
    the images include route images, and
    the arranged parts include the route images arranged in the predetermined positional relationship connecting the route images of adjacent arranged parts to form the specific design.

12. An information processing system, comprising:
    at least one processor; and
    at least one memory coupled thereto, the at least one memory storing computer readable instructions that, when executed by the at least one processor, cause the information processing system to at least:
    arrange, in a virtual space, parts respectively associated with designs, to be displayed on a display device, according to an arrangement operation by a user;
    determine whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts; and
    allow access by another user to arrangement information representing the user arrangement pattern when the user arrangement pattern is not determined as to be the specific pattern, while restricting access by said another user to the arrangement information when the user arrangement pattern is determined as to be the specific pattern, wherein
    the specific design is a specific symbol,
    the processor determines the user arrangement pattern is the specific pattern, when a specific symbol pattern, corresponding to the specific symbol, includes images having a predetermined positional relationship connecting adjacent images to form the specific symbol pattern, and
    the processor does not detect the plurality of the route parts in the user arrangement pattern as the specific symbol pattern when a predetermined design exists in an exception area set for the specific symbol pattern.

13. An information processing system, comprising:
    at least one processor; and
    at least one memory coupled thereto, the at least one memory storing computer readable instructions that, when executed by the at least one processor, cause the information processing system to at least:
    arrange parts, each of which is associated with one of designs, of a plurality of types, to be displayed on a display device, in a virtual space according to an arrangement operation by a user;
    determine whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts, the specific design being formed when the arranged parts are arranged having images in a predetermined positional relationship connecting the images of adjacent arranged parts to form the specific design, and the arranged parts have predetermined designs corresponding to positions of the arranged parts; and
    allow access by another user to arrangement information representing the user arrangement pattern when the user arrangement pattern is not determined as to be the specific pattern, while restricting access by said another user to the arrangement information when the user arrangement pattern is determined as to be the specific pattern, wherein
    the specific design is a specific text string formed by a plurality of characters, and
    the processor detects, from the user arrangement pattern, one or more character arrangement patterns each corresponding to a single character formed by the designs of a plurality of the parts, and determines that the user arrangement pattern is the specific pattern if the user arrangement pattern includes a plurality of the character arrangement patterns and if a text string indicated by the plurality of the character arrangement patterns is the specific text string.

14. The information processing system according to claim 13, wherein the processor does not detect a plurality of the parts in the user arrangement pattern as the character arrangement pattern when any of the one or more character arrangement patterns has a predetermined design in an exception area defined for each of the one or more character arrangement patterns.

15. The information processing system according to claim 13, wherein the one or more character arrangement patterns include a first character arrangement pattern corresponding to a first character, and a second character arrangement pattern corresponding to a second character, a total length of the designs of a plurality of the parts constituting the second character arrangement pattern is longer than a total length of the designs of a plurality of the parts constituting the first character arrangement pattern, and when the user arrangement pattern contains a specific character arrangement pattern corresponding to a single character which could be the first character or the second character, the processor preferentially detects the second character arrangement pattern over the first character arrangement pattern, recognizes the specific character arrangement pattern as the second character arrangement pattern, and when a text string indicated by a plurality of the character arrangement patterns including the second character arrangement pattern is the specific text string, the processor determines the user arrangement pattern is the specific pattern.

16. The information processing system according to claim 13, wherein the one or more character arrangement patterns include a first character arrangement pattern corresponding to a first character, and a second character arrangement pattern corresponding to a second character, the designs of the parts are each a design of a line, where a connection count of each of the parts represents the number of its ends reached by the design, a total connection count of the parts constituting the second character arrangement pattern is larger than a total connection count of the parts constituting the first character arrangement pattern, and when the user arrangement pattern contains a specific character arrangement pattern corresponding to a single character which could be the first character or the second character, the processor preferentially detects the second character arrangement pattern over the first character arrangement pattern, recognizes the specific character arrangement pattern as the second character arrangement pattern, and when a text string indicated by a plurality of the character arrangement patterns including the second character arrangement pattern is the specific text string, determines the user arrangement pattern is the specific pattern.

17. The information processing system according to claim 13, wherein if the parts in the user arrangement pattern could constitute a character arrangement pattern arranged in a first position or a character arrangement pattern arranged in a second position which is closer to a reference position of the virtual space than the first position, the processor preferentially recognizes the parts as those constituting the character arrangement pattern arranged in the second position, and when a text string indicated by a plurality of the character arrangement patterns including the character arrangement pattern arranged in the second position is a specific text string, determines the user arrangement pattern is the specific pattern.

18. The information processing system according to claim 17, wherein the reference position is a left side position within the virtual space.

19. An information processing system, comprising:

at least one processor; and at least one memory coupled thereto, the at least one memory storing computer readable instructions that, when executed by the at least one processor, cause the information processing system to at least:

arrange, in a virtual space, parts respectively associated with designs to be displayed on a display device, according to an arrangement operation by a user;

determine whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts; and allow access by another user to arrangement information representing the user arrangement pattern when the user arrangement pattern is not determined as to be the specific pattern, while restricting access by said another user to the arrangement information when the user arrangement pattern is determined as to be the specific pattern, wherein each of the parts is associated with at least one of a plurality of design types, the processor determines whether each of one or more partial collective designs is the specific pattern containing the specific design, the each of the one or more partial collective designs formed by the parts associated with the same design type out of the design types, and each of the parts is associated with one of a plurality of line types which are the plurality of the design types.

20. An information processing system, comprising:

at least one processor; and at least one memory coupled thereto, the at least one memory storing computer readable instructions that, when executed by the at least one processor, cause the information processing system to at least:

arrange, in a virtual space, parts respectively associated with designs to be displayed on a display device, according to an arrangement operation by a user;

determine whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts; and allow access by another user to arrangement information representing the user arrangement pattern when the user arrangement pattern is not determined as to be the specific pattern, while restricting access by said another user to the arrangement information when the user arrangement pattern is determined as to be the specific pattern, wherein each of the parts has a quadrangular shape, the processor aligns and arranges the parts of the quadrangular shape in the virtual space, and the parts include at least a first part having a line connecting two opposing sides of the first part as its design, a second part having a line connecting two adjacent sides of the second part as its design, and a third part having a line connecting three sides of the third part as its design.

21. A non-transitory computer-readable storage medium having stored therein an information processing program that, when executed by the at least one processor of an information processing apparatus, causes the information processing apparatus to perform operations comprising:

arranging parts, each of which is associated with one of designs, of a plurality of types, to be displayed on a display device, in a virtual space according to an arrangement operation by a user;

determining whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts, the specific design being formed when the arranged parts are arranged having images in a predetermined positional relationship connecting the images of adjacent arranged parts to form the specific design, and the arranged parts have predetermined designs corresponding to positions of the arranged parts; and allowing access by another user to arrangement information representing the user arrangement pattern when the user arrangement pattern is not determined as to be the specific pattern, while restricting access by said another user to the arrangement information when the user arrangement pattern is determined as to be the specific pattern, wherein the specific design is at least one of a specific sign, shape, or character, and the determining includes determining the user arrangement pattern is the specific pattern, when a specific symbol pattern corresponding to the at least one of the specific sign, shape or character formed by the designs of the plurality of the parts is detected from the user arrangement pattern.

22. An information processing apparatus, comprising:

at least one processor; and at least one memory coupled thereto, the at least one memory storing computer readable instructions that, when executed by the at least one processor, cause the information processing system to at least:

arrange parts, each of which is associated with one of designs, of a plurality of types, to be displayed on a display device, in a virtual space according to an arrangement operation by a user;

determine whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts, the specific design being formed when the arranged parts are arranged having images in a predetermined positional relationship connecting the images of adjacent arranged parts to form the specific design, and the arranged parts have predetermined designs corresponding to positions of the arranged parts; and allow access by another user to arrangement information representing the user arrangement pattern when the user arrangement pattern is not determined as to be the specific pattern, while restricting access by said another user to the arrangement information when the user arrangement pattern is determined as to be the specific pattern, wherein the specific design is at least one of a specific sign, shape, or character, and the processor determines the user arrangement pattern is the specific pattern, when a specific symbol pattern corresponding to the at least one of the specific sign, shape or character formed by the designs of the plurality of the parts is detected from the user arrangement pattern.

23. An information processing method executable in an information processing system, the method comprising:

arranging parts, each of which is associated with one of designs, of a plurality of types, to be displayed on a display device, in a virtual space according to an arrangement operation by a user;

determining whether a user arrangement pattern is a specific pattern, the user arrangement pattern containing, an arrangement position, and a design of each of a plurality of the parts arranged in the virtual space according to the arrangement operation by the user, the specific pattern containing a specific design in its collective design formed by the designs of the plurality of the parts, the specific design being formed when the arranged parts are arranged having images in a predetermined positional relationship connecting the images of adjacent arranged parts to form the specific design, and the arranged parts have predetermined designs corresponding to positions of the arranged parts; and allowing access by another user to arrangement information representing the user arrangement pattern when the user arrangement pattern is not determined as to be the specific pattern, while restricting access by said another user to the arrangement information when the user arrangement pattern is determined as to be the specific pattern, wherein the specific design is at least one of a specific sign, shape, or character, and the determining includes determining the user arrangement pattern is the specific pattern, when a specific symbol pattern corresponding to the at least one of the specific sign, shape or character formed by the designs of the plurality of the parts is detected from the user arrangement pattern.

* * * * *